United States Patent
Tosato et al.

(10) Patent No.: US 12,498,213 B2
(45) Date of Patent: Dec. 16, 2025

(54) SENSOR SYSTEM AND METHOD TO DETECT OVERLAPPING OBJECTS

(71) Applicant: Datalogic IP Tech, S.r.l., Bologna (IT)

(72) Inventors: Paolo Tosato, Bologna (IT); Gianluca Sirigu, Cagliari (IT)

(73) Assignee: Datalogic IP Tech, S.r.l., Bologna (IT)

( * ) Notice: Subject to any disclaimer, the term of this patent is extended or adjusted under 35 U.S.C. 154(b) by 196 days.

(21) Appl. No.: 18/545,715

(22) Filed: Dec. 19, 2023

(65) Prior Publication Data

US 2025/0198745 A1 Jun. 19, 2025

(51) Int. Cl.
*G01B 11/06* (2006.01)
*G01V 8/12* (2006.01)

(52) U.S. Cl.
CPC ............... *G01B 11/06* (2013.01); *G01V 8/12* (2013.01)

(58) Field of Classification Search
CPC .......... G01V 8/12; G01B 17/02; G01B 11/06; G01B 11/0608; G01B 11/0691; G01B 11/026; G01S 15/04; G01S 15/003; B65H 2553/20; B65H 2553/80; B65H 2701/173; B65H 2701/175; B65H 2801/42; B65H 7/125

See application file for complete search history.

(56) References Cited

U.S. PATENT DOCUMENTS

| | | | |
|---|---|---|---|
| 2010/0005889 A1* | 1/2010 | Knittel | G01S 7/52004 73/597 |
| 2010/0236894 A1* | 9/2010 | Helm | B65G 61/00 198/460.1 |
| 2014/0078520 A1* | 3/2014 | Manz | B65H 7/04 356/630 |

FOREIGN PATENT DOCUMENTS

| | | | | |
|---|---|---|---|---|
| DE | 3901088 A1 | | 7/1990 | |
| EP | 1201582 B1 * | | 1/2007 | B65H 29/66 |

OTHER PUBLICATIONS

Extended European Search Report, dated Jun. 4, 2025, for European Application No. 24220447.7, 6 pages.

* cited by examiner

*Primary Examiner* — Kara E. Geisel
*Assistant Examiner* — Christina I Xing
(74) *Attorney, Agent, or Firm* — Cozen O'Connor

(57) ABSTRACT

A system including at least one apparatus that measures thicknesses of objects. The apparatus includes a first emitter, a second emitter, a first receiver, and a second receiver. The first emitter and the second receiver are positioned diagonally opposed across a plane, and the second emitter and the first receiver are positioned diagonally opposed across the plane. The first receiver receives a first signal emitted by the first emitter after reflecting off of an object occupying the plane. The second receiver is positioned to receive a second signal emitted by the second emitter after reflecting off of the object. The apparatus includes a circuitry operable to determine the thickness of the object based on reflections of the first signal and the second signal.

20 Claims, 12 Drawing Sheets

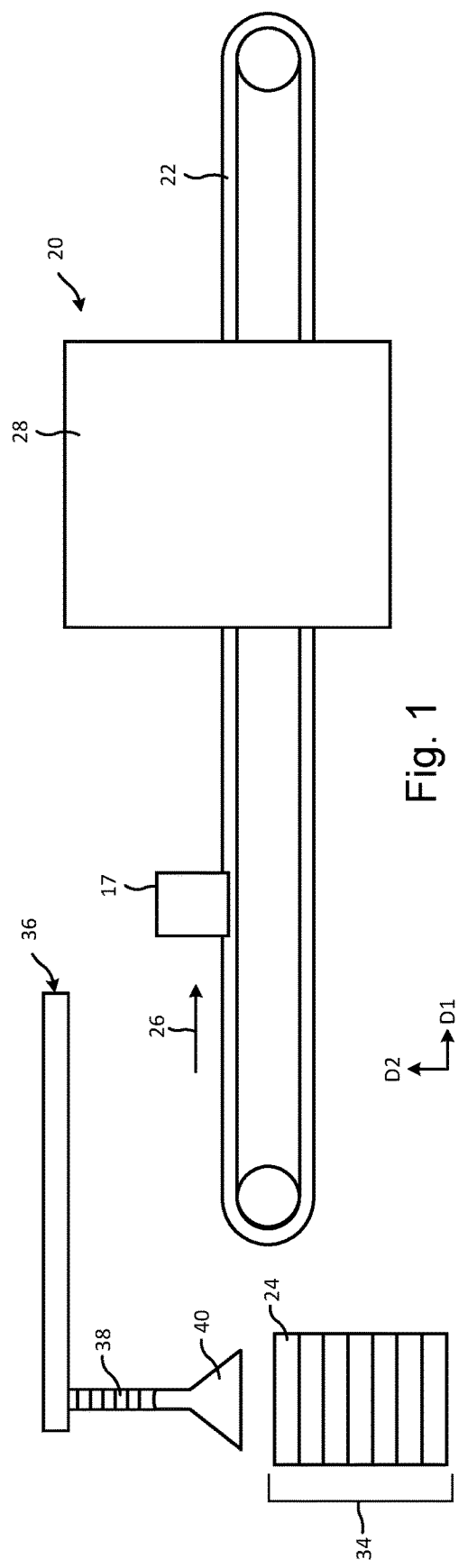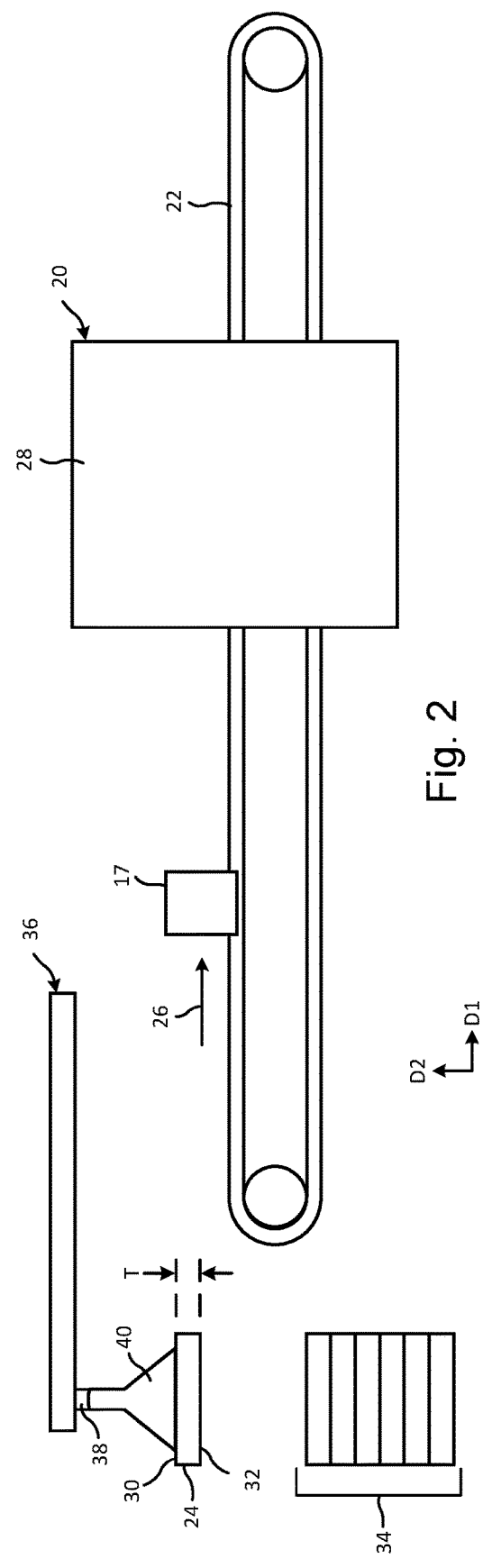

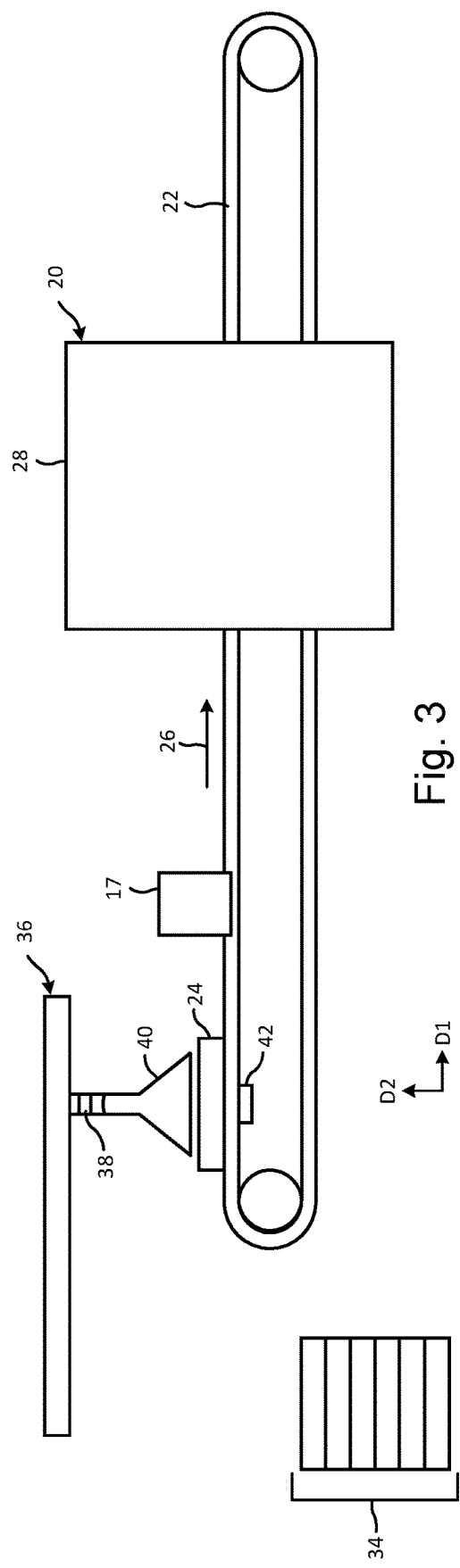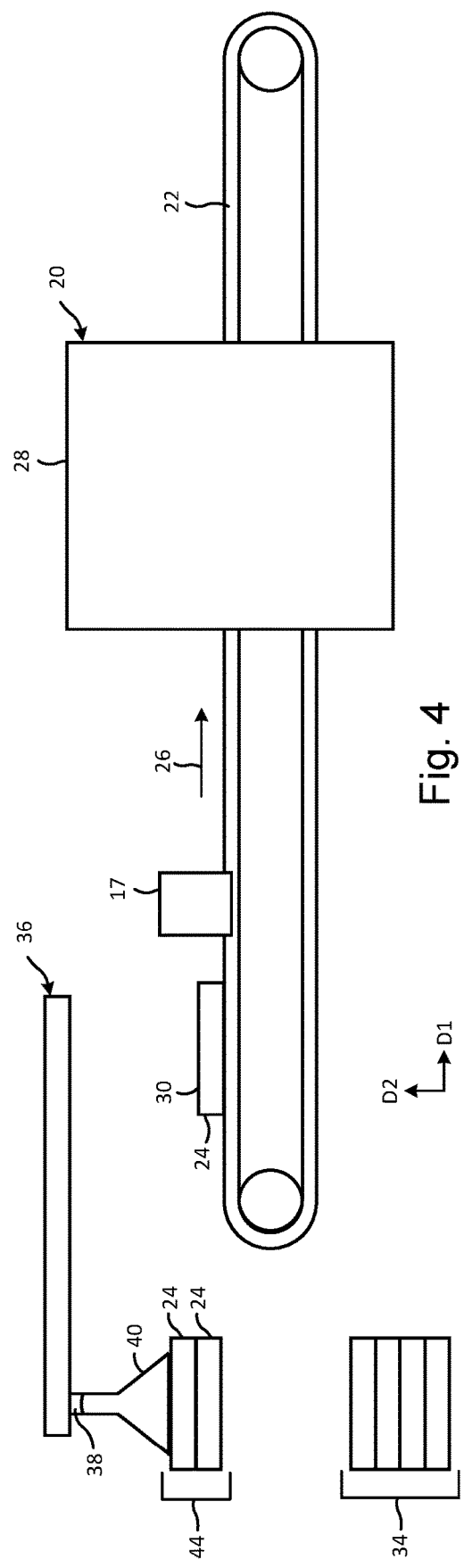

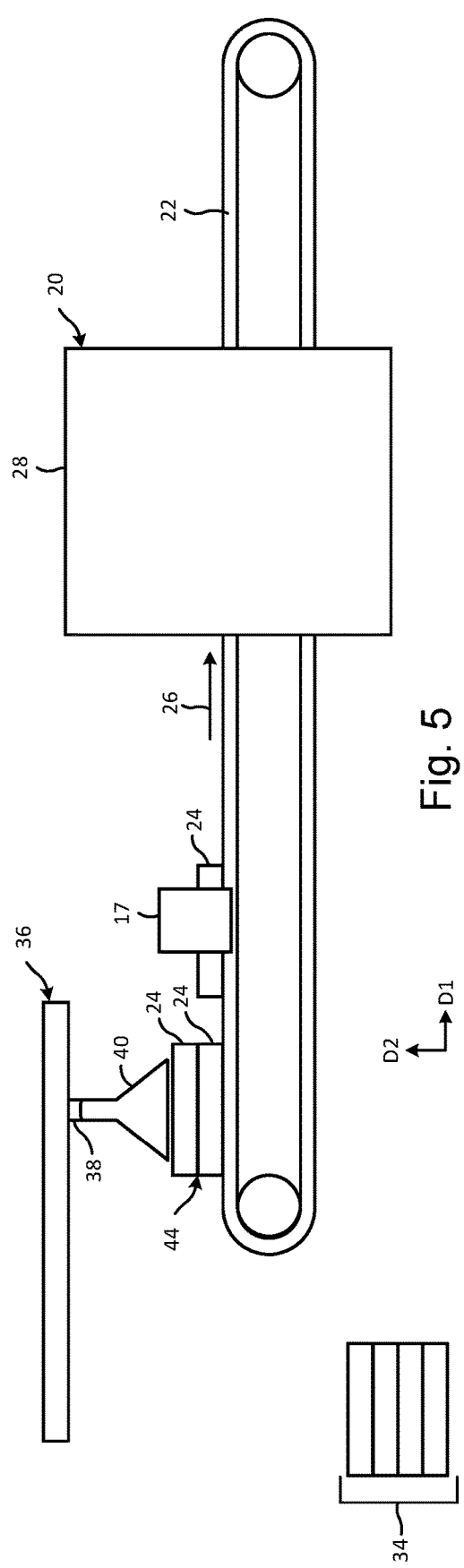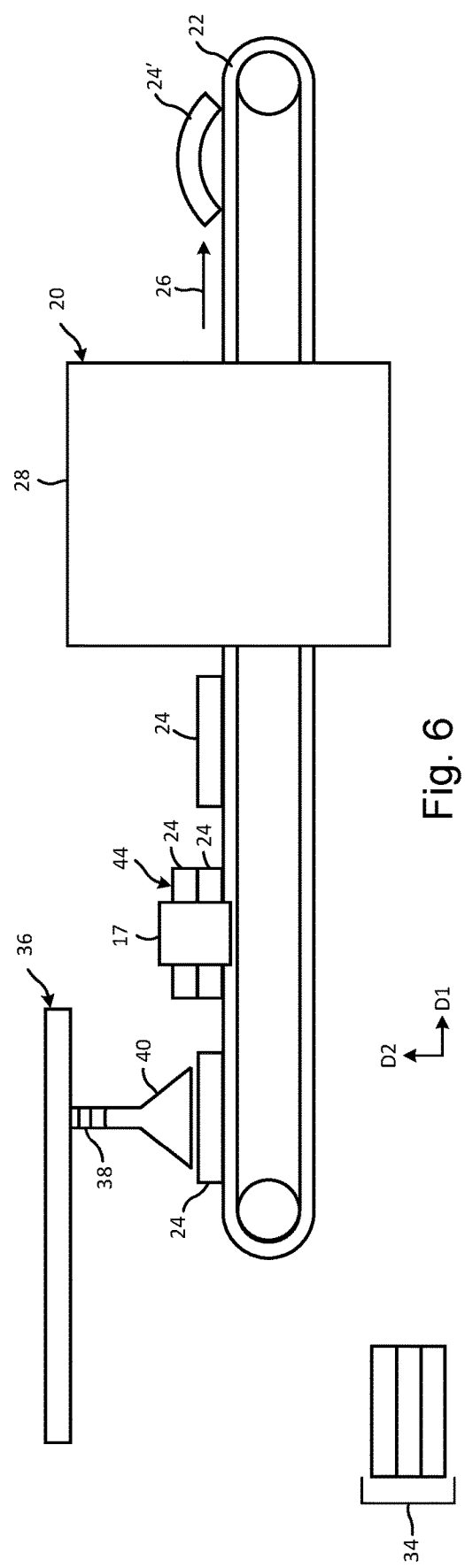

SENSOR SYSTEM AND METHOD TO DETECT OVERLAPPING OBJECTS

BACKGROUND

Technical Field

The present disclosure relates to image acquisition in general, and more specifically to systems that include optical sensors and associated methods that detect the overlapping of two or more reflective objects, for example supported by a conveyor.

Description of the Related Art

Some known industrial manufacturing processes, such as metal forming systems, are fed discrete, flat sheets of material (e.g., metal, plastic, etc.) that are often referred to as "blanks." A stack of blanks may be positioned within an operating envelope of a destacker, such as a material handling robot. To facilitate separation of an individual blank from the remainder of the stack of blanks an end-effector of the robot is moved into position above the stack, and then lifts the uppermost blank off of the stack (e.g., via applied suction, grippers, magnets, etc.). The separated blank is thereafter fed into the machinery of the industrial manufacturing processes.

For many industrial manufacturing processes it is important that only one blank be fed into the machinery at a time. Problems (e.g., electrostatic or electromagnetic phenomena) may occur during the destacking process that result in more than one object/blank being removed from the stack and fed into the machinery. This simultaneous feeding of "stacked" or "overlapped" blanks can lead to complications for the following working steps of the industrial manufacturing process and, sometimes, can also damage machinery.

Known systems and methods to detect overlapping objects (such as blanks) have limitations and drawbacks described in detail below. The applicant has, therefore, determined that it would be desirable to provide systems and methods that improve on the limitations of existing sensor systems and components of such a system to detect overlapping objects.

BRIEF SUMMARY

To avoid the above-referenced complications and potential damage to the machinery, sensors may be positioned between the stack of objects and the machinery to detect the presence of overlapping objects. Upon detection of overlapping blanks, the sensors may initiate an alert that results in removal of the overlapping blanks prior to entering the machinery.

The environment in which the industrial manufacturing processes operate (referred to herein as "the operating environment") may prove challenging to conventional sensors positioned within the environment, resulting in inaccurate and/or unreliable performance of the sensors. For example, the operating environment may include electromagnetic fields due to the presence of a magnetic belt conveyor, which may be present when the stack of blanks is made of a metal/magnetic material. These electromagnetic fields may interfere with the operation of magnetic or inductive sensors. Additionally, and/or alternatively, dirt and/or debris (e.g., nebulized oil) may be present in the operating environment, which may negatively impact the performance of photoelectric sensors. Further, the objects/blanks provided as an input for some industrial manufacturing processes may be shapes other than flat (e.g., arched, curved, irregular, etc.). A non-flat shaped object/blank may limit the effectiveness of a single sensor or sensors that are only positioned on one side of the object/blank. Instead, a differential measurement system may be better suited to accurately detect overlapping objects with a non-flat shape.

Ultrasonic sensors may avoid some of the drawbacks described above, however their use is limited to specific materials (e.g., metal) with specific thicknesses (up to about 3 mm). Ultrasonic sensors typically do not perform well in a forced air environment (e.g., that includes a nebulizer or diffuser). The nebulized substance (e.g., oil) may settle on a surface of the sensor or may be present in the air between the sensor and the surface of the object thereby resulting in measurement errors.

According to one aspect of the disclosure, a sensor system may include one or more of the following elements to improve performance of the system: redundant information; dynamic signal adjustment; collection of data from an increased sample size.

According to one embodiment, an apparatus includes a first emitter, a second emitter, a first receiver, and a second receiver. The first emitter is positioned to emit a first signal toward a plane from a first side of the plane. The second emitter is positioned to emit a second signal toward the plane from a second side of the plane. The second side of the plane is opposed across a thickness of the plane from the first side of the plane, and the second signal is different from the first signal.

The first receiver is positioned to receive the second signal that passes through the plane when the plane is unoccupied, and is further positioned to receive the first signal which reflects from a first surface of an object when the object occupies at least a portion of the plane. The second receiver is positioned to receive the second signal which reflects from a second surface of the object when the object occupies at least a portion of the plane, and is further positioned to receive the first signal that passes through the plane when the plane is unoccupied. The second surface of the object is opposed to the first surface of the object across a thickness of the object.

The apparatus includes a circuitry coupled to the first receiver and at least the second receiver. The circuitry is operable to determine the thickness of the object based on reflections of the first signal and the second signal detected respectively by the first receiver and second receiver when the object occupies at least a portion of the plane.

According to one embodiment, a method of operation of an apparatus includes emitting a first signal from a first emitter of the apparatus towards a plane when a portion of the plane is occupied by a first object having a first thickness. The method further includes detecting the first signal with a first portion of a first receiver of the apparatus after the first signal has reflected off of the first object, and identifying the first thickness as being within an acceptable range of thicknesses.

The method further includes emitting the first signal from the first emitter towards the plane when the portion of the plane is unoccupied, and detecting the first signal with a second receiver of the apparatus after the first signal has passed through the plane.

The method further includes emitting the first signal from the first emitter towards the plane when a portion of the plane is occupied by a second object having a second thickness, detecting the first signal with a second portion of the first receiver after the first signal has reflected off of the second object, and identifying the second thickness as being outside the acceptable range of thicknesses.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

FIG. 1 is a schematic diagram of a system including an apparatus that measures thicknesses of objects, according to at least one illustrated embodiment, prior to commencement of a destacking operation.

FIG. 2 is a schematic diagram of the system illustrated in FIG. 1, the system destacking a first object.

FIG. 3 is a schematic diagram of the system illustrated in FIG. 1, a conveyor of the system supporting the first object.

FIG. 4 is a schematic diagram of the system illustrated in FIG. 1, the system destacking overlapping objects.

FIG. 5 is a schematic diagram of the system illustrated in FIG. 1, the apparatus measuring the thickness of the first object.

FIG. 6 is a schematic diagram of the system illustrated in FIG. 1, the apparatus measuring the thickness of the overlapping objects.

DETAILED DESCRIPTION

Figure 7:
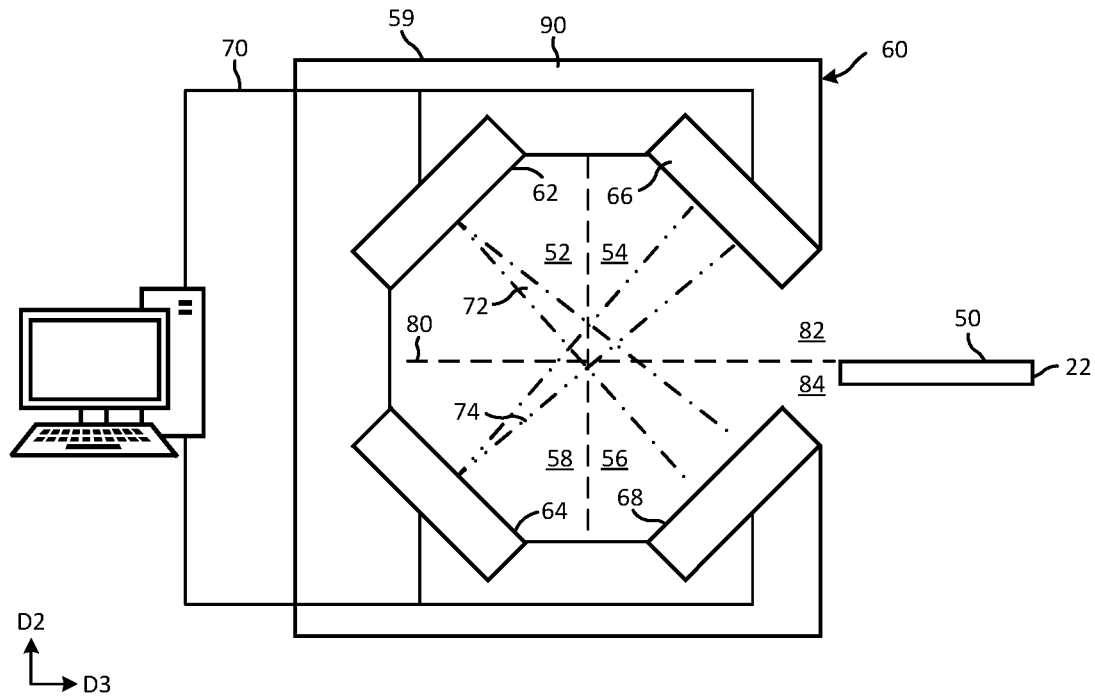
FIG. 7 is a side view of a schematic diagram of the apparatus illustrated in FIG. 1, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the sensors have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

As used in this specification and the appended claims, the terms "active light source" or "active illumination source" mean a device or structure that generates light. Examples of active light sources or active illumination sources include, but are not limited to light emitting diodes (LEDs), flash strobes, incandescent or fluorescent lamps, or halogen bulbs. Such are typically responsive to some stimulus, for example an electric current or voltage.

The headings and Abstract of the Disclosure provided herein are for convenience only and do not limit the scope or meaning of the embodiments.

Referring to FIGS. 1 to 6, a system 20 may include a conveyor 22 (e.g., a conveyor belt) that moves objects 24 in a first direction D1 (e.g., along a defined path, represented by arrow 26). The object 24 may be a "blank" that undergoes an industrial manufacturing process as it advances through the system 20. According to one embodiment, the object 24 is supported by the conveyor 22 as the object 24 moves towards machinery 28 of the system 20. The machinery 28 receives the object 24 as an input, alters (e.g., bends, cuts, shapes, forms, etc.) the object 24, and outputs an altered object 24'.

The object 24 may have a thickness T measured from a first surface 30 of the object 24 to a second surface 32 of the object 24, such that the first surface 30 and the second surface 32 are opposed (e.g., face away from one another in opposite directions) across the thickness T. As shown, the object 24 may be supported by the conveyor 22 such that thickness is offset from (e.g., perpendicular to) the defined path 26.

The object 24 may be one of a plurality of objects 24 provided as a stack 34. As shown, the stack 34 may include a plurality of the objects 24 with adjacent ones overlapping (or "stacked") such that their thicknesses are aligned (e.g., colinear or parallel). According to one embodiment, the first surface 30 of one of the objects 24 in the stack 34 faces (e.g., directly abuts) the second surface 32 of an adjacent one of the objects 24 in the stack 34 (e.g., an object 24 directly above the one object 24), and the second surface 32 of the one of the objects 24 in the stack 34 faces (e.g., directly abuts) the first surface 30 of another adjacent one of the objects 24 in the stack 34 (e.g., an object 24 directly below the one object 24).

The system 20 may include a destacker 36 that separates one of the objects 24 from the stack 34. According to one embodiment, the destacker 36 includes a robotic arm 38 with an end-effector 40 that is movable into a position above the stack 34 (e.g., as shown in FIG. 1). As shown in FIG. 2, once positioned proximate to the stack 34 (e.g., via the robotic arm 38) the end-effector 40 may remove one of the objects 24 from the stack 34 (e.g., by lifting an uppermost one of the objects 24 vertically away from the remainder of the objects 24 in the stack 34). The end-effector 40 may manipulate the object via applied suction, grippers, magnets, or other instruments and methods known within the field of material handling.

After removal from the stack 34, the destacker 36 may move the object 24 to the conveyor 22 and the end-effector 40 may release the object 24 (e.g., as shown in FIG. 3) thereby placing the object 24 on the conveyor 22 such that the object 24 is supported by the conveyor 22. After being released by the end-effector 40, the conveyor 22 may passively support the object 24 (e.g., blocking movement of the object 24 in a second direction D2 that is perpendicular to the first direction D1, such that only gravity holds the object 24 in place relative to the conveyor 22). According to one embodiment, the conveyor 22 may include an active retention mechanism 42 that secures the object 24 relative to the conveyor 22. According to one embodiment, the active retention mechanism 42 may be magnetic (e.g., including magnets or magnetic fields), physical (e.g., including clips or brackets), or another known type that exerts a force upon the object 24 or blocks movement of the object 24 relative to the conveyor 22 as the object 24 travels along the defined path 26.

Occasional problems (e.g., electrostatic or electromagnetic phenomena) or errors (e.g., a defect in the object 24) may result in more than one object 24 being removed simultaneously from the stack 34 (as shown in FIG. 4). The simultaneously removed objects 24 may be placed on the conveyor 22 (e.g., by the destacker 36) such that at least a portion of the objects 24 "overlap" (as shown in FIG. 5). Simultaneous entry of multiple objects 24 overlapping with one another (referred to collectively herein as overlapping objects 44) may result in complications for the following working steps of the industrial manufacturing process. These complications may include defective altered objects 24' and/or damage to the machinery 28, among other undesirable outcomes.

The system 20 may include a sensor system 17 that detects the objects 24 travelling towards the machinery 28 (e.g., along the defined path 26) and identifies overlapping objects 44 prior to their entry into the machinery 28. According to one embodiment, the sensor system 17 may be positioned along the defined path 26 (e.g., upstream of the machinery 28) such that the objects 24 supported by the conveyor 22 travelling along the defined path 26, towards the machinery 28, pass through a field of view of the sensor system 17 (as shown in FIG. 6). Alternatively or additionally, the sensor system 17 may include components positioned between the stack 34 and the conveyor 22 (e.g., such that the objects 24 being moved by the destacker 36 from the stack 34 to the conveyor 22 pass through a field of view of the sensor system 17).

According to one embodiment, the sensor system 17 may detect the overlapping objects 44 passing through the field of view of the sensor system 17. Upon detection of the overlapping objects 44, the sensor system 17 may initiate a response to prevent entry of the overlapping objects 44 into the machinery 28. For example, the sensor system 17 may halt the conveyor 22 upon detection of the overlapping objects 44, so that the overlapping objects 44 may be removed prior to restarting the conveyor 22. The system 20 may include a removal assembly (not shown) that, upon detection of the overlapping objects 44, removes the overlapping objects 44 from the conveyor 22 prior to their entry into the machinery 28.

Sensors that measure thickness of objects passing through a field of view of the sensor are known. For example, known ultrasonic sensors include a transmitter positioned on one side of an object and a receiver positioned on the other side of the object. The transmitter emits an ultrasonic signal and the receiver captures the transmitted signal after the signal passes through the object. The reduction in strength of the signal received by the receiver compared to the signal emitted by the transmitter may be evaluated to determine the thickness of the object.

However, performance of known ultrasonic sensors is negatively impacted by objects above certain thicknesses (typically greater than 2 to 3 mm). Additionally, ultrasonic sensors may be less accurate when the objects being measured have a non-uniform thickness (e.g., cardboard) compared to objects with a uniform thickness (e.g., a metal sheet). Further, the working environment for industrial manufacturing processes may include dirt, nebulized oil, or other airborne debris, the presence of which hinders accurate measurements by known ultrasonic sensors.

Referring to FIGS. 7 to 10, an apparatus 60 (e.g., a component of the system 20, shown in FIGS. 1 to 6), may include a first emitter 62, a second emitter 64, a first receiver 66, and a second receiver 68. The first emitter 62 may be positioned to emit a first signal 72 (e.g., electromagnetic radiation) toward a plane 80 from a first side 82 of the plane 80. The system 20 may be described with reference to an orthonormal reference system. As shown, the plane 80 may be parallel to (e.g., coplanar with) a surface 50 of the conveyor 22 that supports (e.g., directly abuts) the objects 24 such that the plane 80 is parallel to the first direction D1, is normal to the second direction D2, and is parallel to a third direction D3 that is perpendicular to both the first direction D1 and the second direction D2. According to one embodiment the plane 80 may be a reference plane with a position that is independent of the conveyor 22. The first emitter 62 may emit the first signal 72 with a line spot emission shape.

The second emitter 64 may be positioned to emit a second signal 74 (e.g., electromagnetic radiation) toward the plane 80 from a second side 84 of the plane 80. As shown, the second side 84 of the plane 80 may be opposed across a thickness of the plane 80 from the first side 82 of the plane 80. The second emitter 64 may emit the second signal 74 with a line spot emission shape (e.g., the same as the shape of the first signal 72).

While used herein to assist in the description of the relative positions of components of the system 20, operation of the system 20 may be independent of any specific position and/or orientation of the plane 80 or even the existence of the plane 80. One of the advantages of the pairs of first and second emitters 62 and 64 and first and second receivers 66 and 68 is the avoidance of reliance on a known reference plane, as further described below. With both sides of the object 24 being "scanned" or reflecting a respective one of the first and second signals 72 and 74 a thickness of the object 24 may be measured along the second direction D2, regardless of the exact position of the object. Small variations in the relative height (position along the second direction D2) of subsequent objects 24 will not negatively impact accuracy of thicknesses calculated by the system 20.

The first signal 72 (represented by dash-dot lines) and the second signal 74 (represented by dash-dot-dot lines) may be different from one another such that a receiver receiving either the first signal 72 or the second signal 74 is able to identify which signal is being received. For example, the first signal 72 and the second signal 74 may be externally synchronized with both the first receiver 66 and the second receiver 68 to distinguish the source of the signal being received either the first receiver 66 or the second receiver 68 in a specific moment in time. According to one embodiment, the first signal may include a first pattern, and the second signal may include a second pattern that is different than the first pattern.

Figure 8:
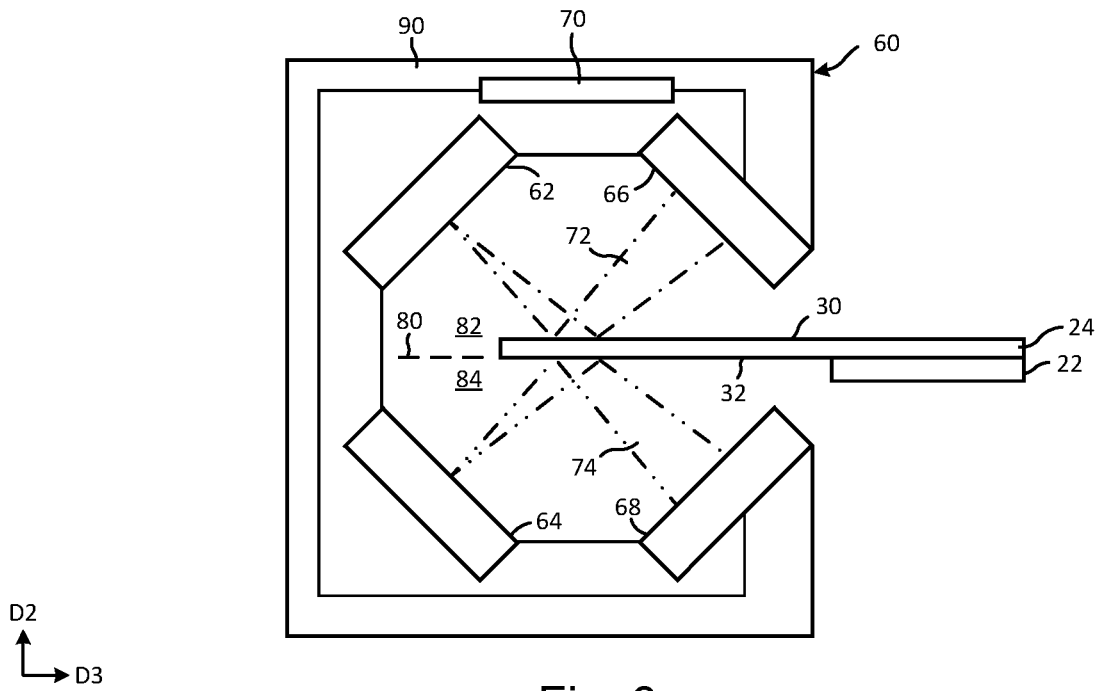
FIG. 8 is a side view of a schematic diagram of the apparatus illustrated in FIG. 7, with the first object occupying at least a portion of a plane between components of the apparatus.

The first receiver 66 may be positioned to receive the second signal 74 that passes through the plane 80 when the plane 80 is unoccupied (i.e., there is no object 24 present between the first receiver 66 and the second emitter 64 along a path of the second signal 74) as shown in FIG. 7. The first receiver 66 may further be positioned to receive the first signal 72, after the first signal 72 reflects from the first surface 30 of the object 24 when the object 24 occupies at least a portion of the plane 80 (e.g., when the object 24 is supported by the conveyor 22) as shown in FIG. 8. According to one embodiment, the first receiver 66 may be positioned diagonally opposite from the first emitter 62 across the plane 80. The first receiver 66 may include a line array sensor that corresponds in shape to the first signal 72.

The second receiver 68 may be positioned to receive the second signal 74, after the second signal 74 reflects from the object 24 (e.g., the second surface 32 of the object 24) when the object 24 occupies at least a portion of the plane 80 (e.g., when the object 24 is supported by the conveyor 22) as shown in FIG. 8. The second receiver 68 may further be positioned to receive the first signal 72 that passes through the plane 80 when the plane 80 is unoccupied (i.e., there is no object 24 present between the second receiver 68 and the first emitter 62 along a path of the first signal 72) as shown in FIG. 7. As shown, the second surface 32 of the object 24 may be opposed to the first surface 30 of the object 24 across the thickness T of the object 24, and the thickness T of the object 24 may be parallel to the thickness of the plane 80. The second receiver 68 may include a line array sensor that corresponds in shape to the second signal 74.

As shown, the first emitter 62 may be located in a first quadrant 52, the first receiver 66 may be located in a second quadrant 54, the second receiver 68 may be located in a third quadrant 56, and the second emitter 64 may be located in a fourth quadrant 58 of a rectangular frame 59. The first, second, third, and fourth quadrants 52, 54, 56, and 58 may be arranged successively either clockwise (as shown) or counterclockwise around the rectangular frame 59.

According to one embodiment, the apparatus 60 may include circuitry 70 electrically coupled to the first emitter 62, the second emitter 64, the first receiver 66, the second receiver 68, or any combination thereof. According to one embodiment, the circuitry 70 may be operable to synchronize the first signal 72 and the second signal 74 with the first receiver 66 and the second receiver 68, as described above. The circuitry 70 may be operable to determine a thickness of the object(s) 24 passing through the apparatus 60 based on reflections of the first signal 72 and the second signal 74 detected respectively by the first receiver 66 and second receiver 68 when the object(s) 24 occupy at least a portion of the plane 80.

The circuitry 70 may include software stored in memory (e.g., a computer-readable medium for use by or in connection with any computer and/or processor related system or method). In the context of this document, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium.

More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

According to one embodiment, the circuitry 70 may be enclosed entirely within a housing 90 of the apparatus 60, the housing 90 also enclosing the first emitter 62, the second emitter 64, the first receiver 66, and the second receiver 68, as shown in FIG. 8. According to another embodiment, the circuitry 70 may be at least partially external to the housing 90 of the apparatus 60, as shown in FIG. 7.

The circuitry 70 may determine whether the object 24 occupies at least a portion of the plane 80 based whether the first receiver 66 has detected the first signal 72 having the first pattern or the second signal 74 having the second pattern, whether the second receiver 68 has detected the first signal 72 having first pattern or the second signal 74 having the second pattern, or both.

According to one embodiment, the first emitter 62 may emit the first signal 72 as a first pattern of electromagnetic radiation, and the second emitter 64 may emit the second signal 74 as a second pattern of electromagnetic radiation. The first receiver 66 and the second receiver 68 may each be responsive to the electromagnetic radiation, and the circuitry 70 may determine whether an object (e.g., the object 24, the overlapping objects 44, etc.) occupies at least a portion of the plane 80 based on whether the first receiver 66 has detected the first signal 72 having the first pattern of electromagnetic radiation or the second signal 74 having the second pattern of electromagnetic radiation, whether the second receiver 68 has detected the first signal 72 having the first pattern of electromagnetic radiation or the second signal 74 having the second pattern of electromagnetic radiation, or based on both of the above.

According to one embodiment, the first emitter 62 may emit the first signal 72 as a first pattern of acoustic energy, and the second emitter 64 may emit the second signal 74 as a second pattern of acoustic energy. The first receiver 66 and the second receiver 68 may each be responsive to the acoustic energy, and the circuitry 70 may determine whether an object (e.g., the object 24, the overlapping objects 44, etc.) occupies at least a portion of the plane 80 based on whether the first receiver 66 has detected the first signal 72 having the first pattern of acoustic energy or the second signal 74 having the second pattern of acoustic energy, whether the second receiver 68 has detected the first signal 72 having the first pattern of acoustic energy or the second signal 74 having the second pattern of acoustic energy, or based on both of the above.

The first emitter 62 and the first receiver 66 may be supported within the apparatus 60 (e.g., secured to the housing 90) such that an entirety of the first signal 72 is collected by the first receiver 66 for a range of thickness of the object 24 passing through the apparatus 60 (e.g., occupying a portion of the plane 80). For example, the first emitter 62 and the first receiver 66 may be positioned such that an entirety of the first signal 72 is collected by the first receiver 66 after reflecting off of the first surface 30 of an object (e.g., the object 24) with a first thickness T1 and after reflecting off of the first surface 30' of an object (e.g., the overlapping objects 44) with a second thickness T2 that is greater than (e.g., at least twice that) of the first thickness T1.

Figure 9:
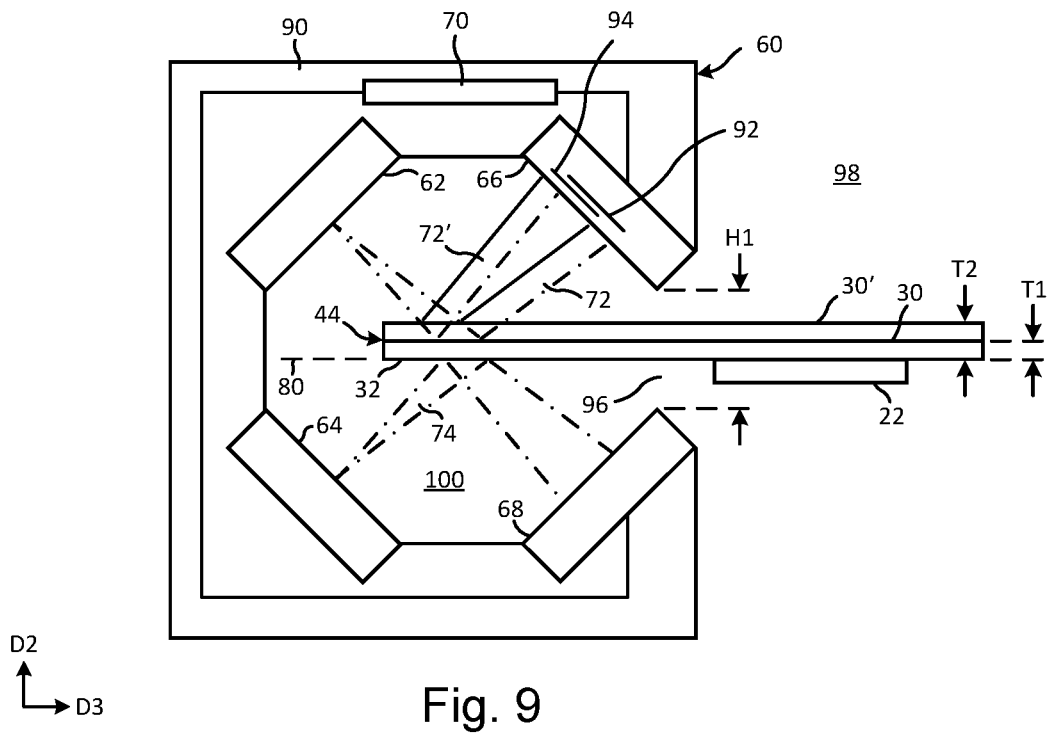
FIG. 9 is a side view of a schematic diagram of the apparatus illustrated in FIG. 7, with the overlapping objects occupying at least a portion of the plane between components of the apparatus.

As shown in FIG. 9, when the object 24 with the first thickness T1 is at least partially occupying the plane 80, the first signal 72 (represented by dash-dot lines) reflects off of the first surface 30 and is collected by a first portion 92 (e.g., a first subset of the line array sensor) of the first receiver 66. When the overlapping objects 44 with the second thickness T2 are at least partially occupying the plane 80, the first signal 72' (represented by solid lines) reflects off of the first surface 30' and is collected by a second portion 94 (e.g., a second subset of the line array sensor) of the first receiver 66. The first portion 92 and the second portion 94 may (but are not required to) have some overlap. The first portion 92 and the second portion 94 are shown offset from one another for the sake of clarity of the drawings. Any overlapping sections of the first portion 92 and the second portion 94 may be the same part of the line array sensor.

According to one embodiment, the first emitter 62 and the first receiver 66 may be supported within the apparatus 60 (e.g., separated from the plane 80 by respective distances and oriented at respective angles with respect to the planes) such that an entirety of the first signal 72 is collected by the first receiver 66 for when reflecting off of objects varying in thickness from about 2 mm to about 10 mm. The first thickness T1 of the object 24 may be about 2 mm, which means overlapping objects 44 may have a second thickness T2 of about 4 mm. Thus, the first emitter 62 and the first receiver 66 may be supported within the apparatus 60 (e.g., separated from the plane 80 by respective distances and oriented at respective angles with respect to the planes) such that at least a portion of the first portion 92 and the second portion 94 are offset (i.e., do not overlap). If the apparatus 60 is calibrated for larger thicknesses the relatively small difference (e.g., 2 mm) between the first thickness T1 and the second thickness T2 may not be detectable by the first receiver 66.

The apparatus 60 may be dimensioned so as to be compatible with the system 20, the object 24, and the overlapping objects 44. According to one embodiment, the outer dimensions of the apparatus 60 (e.g., the housing 90) are small enough to fit along the defined path 26 (e.g., adjacent the conveyor 22 such that the objects 24 supported by the conveyor 22 pass through the plane 80 and intersect the first signal 72).

According to one embodiment, the housing 90 may include an opening 96 that provides passage from an exterior 98 of the apparatus 60 to an interior 100 of the apparatus 60. The interior 100 may be bounded by interior surfaces of the apparatus 60 (e.g., the first emitter 62, the second emitter 64, the first receiver 66, the second receiver 68, and surfaces of the housing 90 that face the plane 80), and the exterior 98 may be a remainder of the volume surrounding the apparatus 60.

As shown in the illustrated embodiment, the opening 96 may have a height H1 that is measured in the same direction as the first thickness T1 and the second thickness T2 (e.g., along the second direction D2). According to one embodiment, the first height H1 is greater than the second thickness T2 to allow passage of the overlapping objects 44 through the opening 96 and into the interior 100.

The apparatus 60 may include at least two phases of operation including a measurement phase and an adjustment phase. The measurement phase is generally characterized by the first receiver 66 detecting/collecting the first signal 72 from the first emitter 62 (e.g., as shown in FIGS. 8 and 9). As shown, the first emitter 62 and the first receiver 66 may be positioned such that the first signal 72 does not intersect and is not collected by the first receiver 66 unless an object (e.g., the object 24 or the overlapping objects 44) are occupying at least a portion of the plane 80 so as to reflect the first signal 72 to the first receiver 66.

During the measurement phase the apparatus 60 measures a thickness (e.g., the first thickness T1, the second thickness T2) of an object (e.g., the object 24, the overlapping objects 44) occupying at least a portion of the plane 80. According to one embodiment, if the object 24 is flat (e.g., has a flat bottom surface 32) the thickness measurement may be based only on the first signal 72. When the object 24 or the overlapping objects 44 are supported by the conveyor 22 their respective bottom surface 32 may be in the same position such that the second signal 74 is received/detected by the same portion of the second receiver 68. In other words, when the object 24 is flat, the second receiver 68 may not be able to distinguish between the object 24 occupying at least a portion of the plane 80 and the overlapping objects 44 occupying at least a portion of the plane.

The apparatus 60 may include a calibration phase during which the apparatus 60 (e.g., the circuitry 70) is "taught"

criteria (e.g., the first portion 92 and the second portion 94) for identification of the object 24 and the overlapping objects 44. Teaching the apparatus 60 the criteria may include applying machine learning algorithms to collected data, according to one embodiment. The calibration phase may be useful for embodiments in which the apparatus 60 is adaptable to detect various objects of various thicknesses. According to one embodiment, the apparatus 60 may be pre-configured for a specific object with a specific thickness, and thus does not include a calibration phase.

The adjustment phase is generally characterized by the second receiver 68 detecting/collecting the first signal 72 from the first emitter 62 and/or the first receiver 66 detecting/collecting the second signal 74 from the second emitter 64 (e.g., as shown in FIG. 7). As shown, the first emitter 62 and the second receiver 68 may be positioned such that the first signal 72 intersects and is collected by the second receiver 68 unless an object (e.g., the object 24 or the overlapping objects 44) occupies at least a portion of the plane 80 so as to reflect the first signal 72 away from the second receiver 68.

During the adjustment phase the apparatus 60 may detect the absence of the object 24 (e.g., via the second receiver 68 detecting/collecting the first signal 72). The adjustment phase enables the apparatus 60 to compensate for debris (e.g., dirt, nebulized oil, etc.) in the operating environment (e.g., on and/or between one or more components of the apparatus 60).

Referring to FIGS. 7 to 11, a method of operation 150 of an apparatus 60 may include at 152 emitting the first signal 72 from the first emitter 62 and at 154 emitting the second signal 74 from the second emitter 64. The first signal 72 and the second signal 74 may be emitted simultaneously, or with an offset (e.g., synchronized as described above) in time between them. As shown in FIG. 7, if the interior 100 is empty (e.g., devoid of an object, such as the object 24 or the overlapping objects 44), at 156 the method 150 may include receiving the first signal 72 with the second receiver 68 and receiving the second signal 74 with the first receiver 66. The method 150 may then return to the start.

As shown in FIGS. 8 and 9, if an object (e.g., the object 24 or the overlapping objects 44) is present in the interior 100, the method 150 may include at 158 receiving the first signal 72 with the first receiver 66 and receiving the second signal 74 with the second receiver 68. At 160 the method 150 includes calculating/measuring/determining a thickness of the object (e.g., the first thickness T1 of the object 24, the second thickness T2 of the overlapping objects 44, etc.) present in the interior 100 based on the first signal 72 and the second signal 74 received at 158.

If the calculated thickness of the object present in the interior 100 is within an acceptable range of values, the method 150 may return to the start. For example, the method 150 may include identifying the first thickness T1 as being within an acceptable range of thicknesses (e.g., between 1.5 mm and 2.5 mm). The acceptable range of thicknesses may extend above and below the expected thickness of the object 24 (e.g., 2 mm), but not so far as to encompass the expected thickness of two of the objects 24 stacked (or overlapping) on top of one another (e.g., 4 mm).

If the calculated thickness of the object present in the interior 100 is outside the acceptable range of values, at 162 the method 150 may include identifying the object present in the interior 100 as an overlapping object (e.g., overlapping object the 44). At 164 the method 150 may include one or more additional actions in response to the identification of the overlapping object. For example, the one or more additional actions may include removal of the overlapping object from the defined path 26, triggering an alarm, slowing and/or stopping the conveyor 22, or any combination thereof. The method 150 may then return to the start (e.g., automatically after resolution of the additional actions, upon receipt of input from a user, etc.).

Referring to FIGS. 7 to 10 and 12, a method of operation 180 of an apparatus 60 may include at 182 emitting the first signal 72 from the first emitter 62 towards the plane 80 when a portion of the plane 80 is occupied by the object 24 having the first thickness T1. Prior to operation of the apparatus 60, or as part of the method 180, an initial calibration may be performed to set/determine the position of the plane 80. As shown in FIG. 7, if the plane 80 is empty (e.g., devoid of an object, such as the object 24 or the overlapping objects 44), at 184 the method 180 may include receiving the first signal 72 with the second receiver 68. The method 180 may then return to the start.

As shown in FIGS. 8 and 9, if an object (e.g., the object 24 or the overlapping objects 44) is occupying a portion of the plane 80, the method 180 may include at 186 receiving the first signal 72 with the first receiver 66. The method may include, at 188, detecting the first signal 72 with the first portion 92 of the first receiver 66 after the first signal 72 has reflected off of the first object 30. After detecting the first signal 72 with the first portion 92 of the first receiver 66, the method 180 may return to the start. In response to the first portion 92 detecting the first signal 72, the method 180 may include identifying a thickness of the object occupying the portion of the plane 80 as being the first thickness T1 and within an acceptable range of thicknesses (e.g., between 1.5 mm and 2.5 mm). The acceptable range of thicknesses may extend above and below the expected thickness of the object 24 (e.g., 2 mm), but not so far as to encompass the expected thickness of two of the objects 24 stacked (or overlapping) on top of one another (e.g., 4 mm).

The method 180 may further include, at 188, detecting the first signal 72 with the second portion 94 of the first receiver 66 (e.g., after the first signal 72 has reflected off of the overlapping objects 44). At 190 the method 180 may include identifying the thickness of the object occupying the portion of the plane 80 as being the second thickness T2 and being outside the acceptable range of thicknesses (e.g., above 2.5 mm, or whatever upper value is selected for the acceptable range). Thus, at 190 the method 180 may include identifying the object occupying the portion of the plane 80 as overlapping objects (e.g., overlapping objects 44).

In response to the identification of the object occupying the portion of the plane 80 as being an overlapping object, at 192 the method 180 may include one or more additional actions. For example, the one or more additional actions may include removal of the overlapping object from the defined path 26, triggering an alarm, slowing and/or stopping the conveyor 22, or any combination thereof. The method 180 may then return to the start (e.g., automatically after resolution of the additional actions, upon receipt of input from a user, etc.).

Referring to FIGS. 13 to 19, the first receiver 66 may include a series of cells 102 (two of which are labeled in FIG. 13) that cooperatively form the line array sensor 104 of the first receiver 66. When in the measurement phase, the first signal 72 may be received by a number of the cells 102 that cooperatively form the first portion 92 of the first receiver 66, and the first signal 72' may be received by a number of the cells 102 that cooperatively form the second portion 94 of the first receiver 66. According to one embodiment, some of the cells 102 may form part of both the first portion 92 and the second portion 94.

Figure 13:
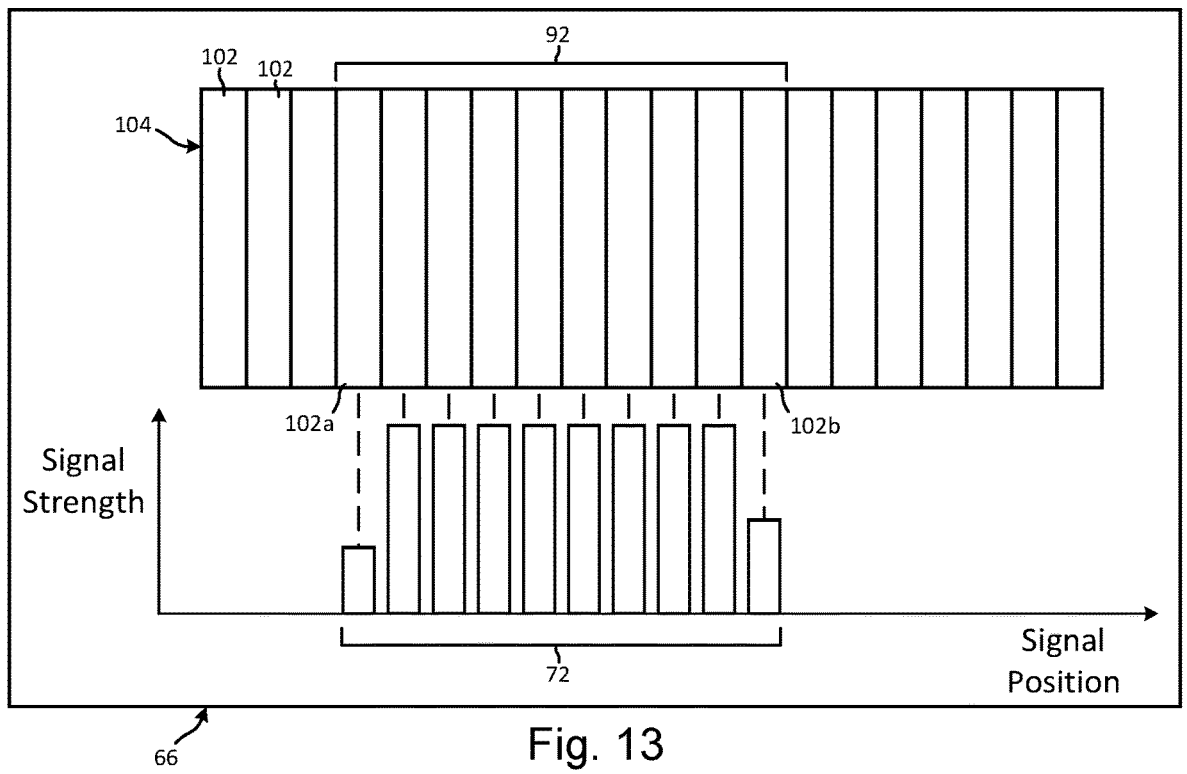
FIG. 13 is a schematic diagram of a line array sensor of a component of the apparatus illustrated in FIG. 7, according to at least one illustrated embodiment, with a first portion of the line array sensor receiving a signal.

As shown in FIG. 13, the object 24 with the first thickness T1 is occupying at least a portion of the plane 80 (e.g., as shown in FIG. 8). After reflecting off of the first surface 30 of the object 24, the first signal 72 is received/collected by the cells 102 of the first portion 92 of the first receiver 66.

Figure 10:
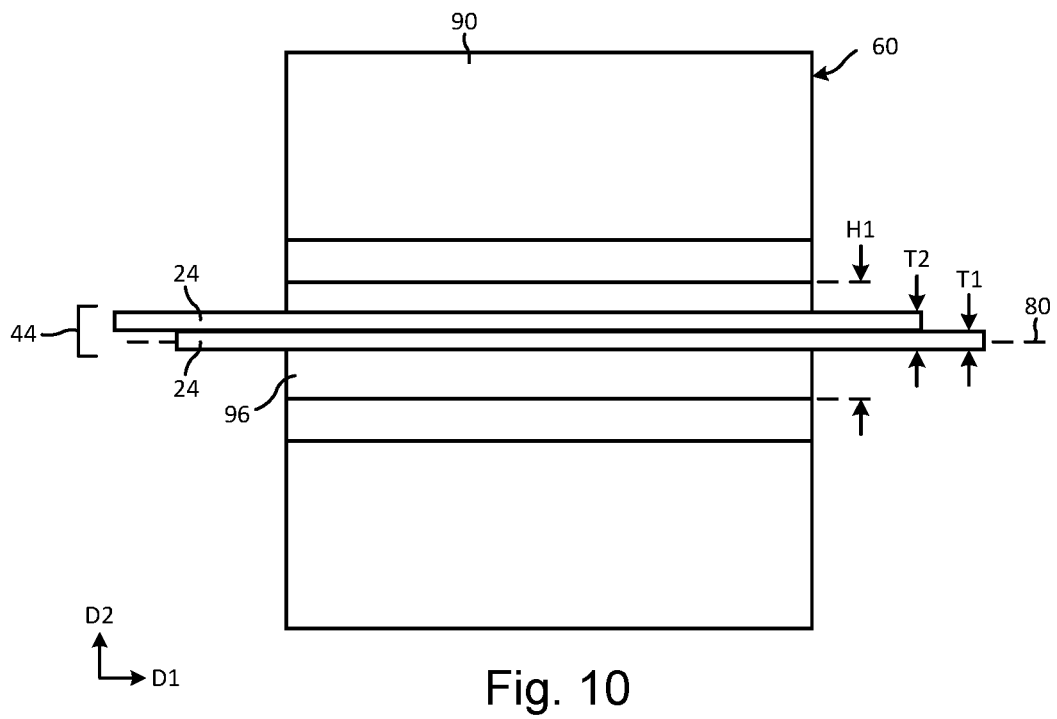
FIG. 10 is a front view of a schematic diagram of the apparatus illustrated in FIG. 7, with the overlapping objects occupying at least a portion of the plane between components of the apparatus.
Figure 11:
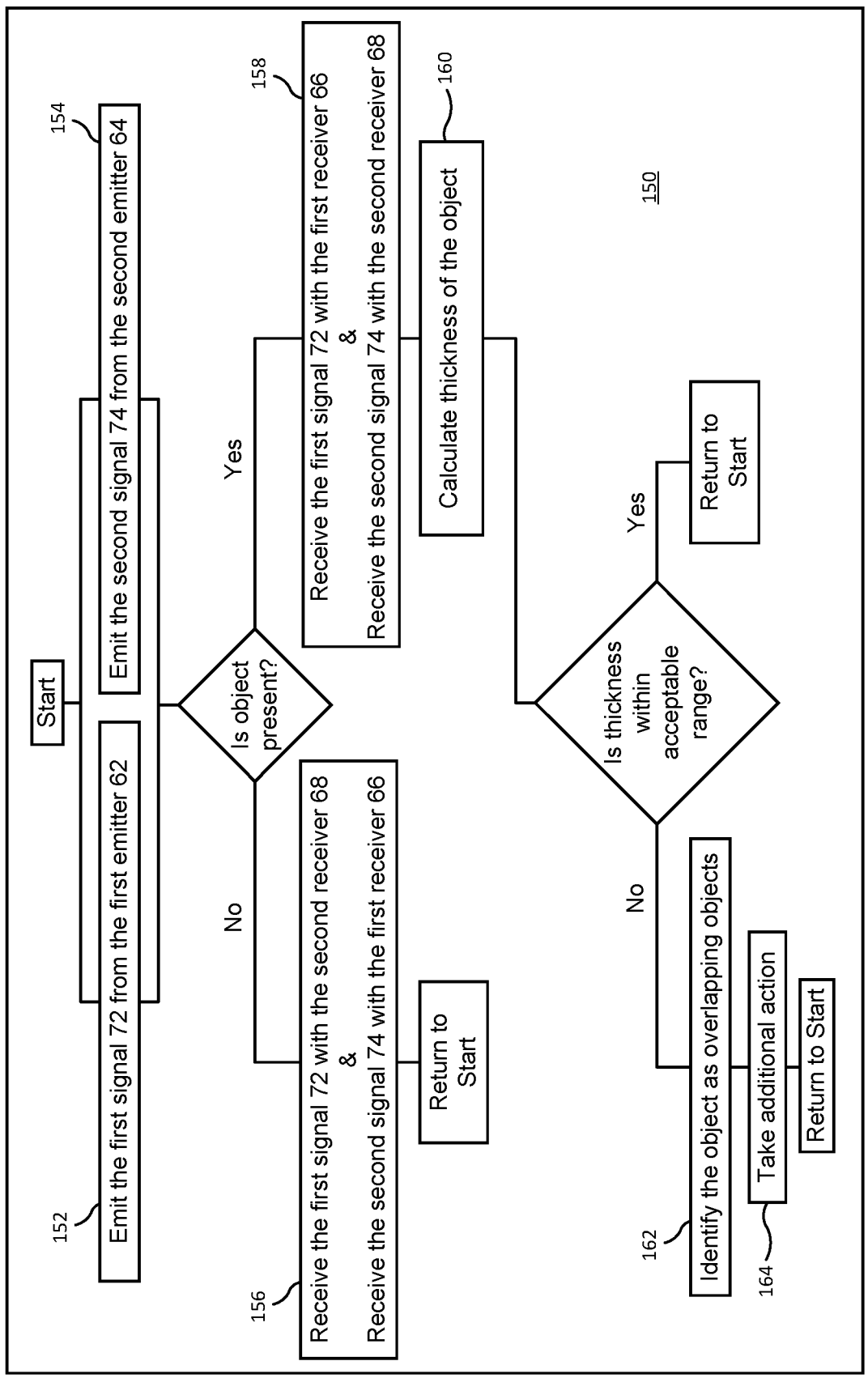
FIG. 11 is a flow diagram of a method of operation of the apparatus illustrated in FIG. 7, according to at least one illustrated embodiment.
Figure 12:
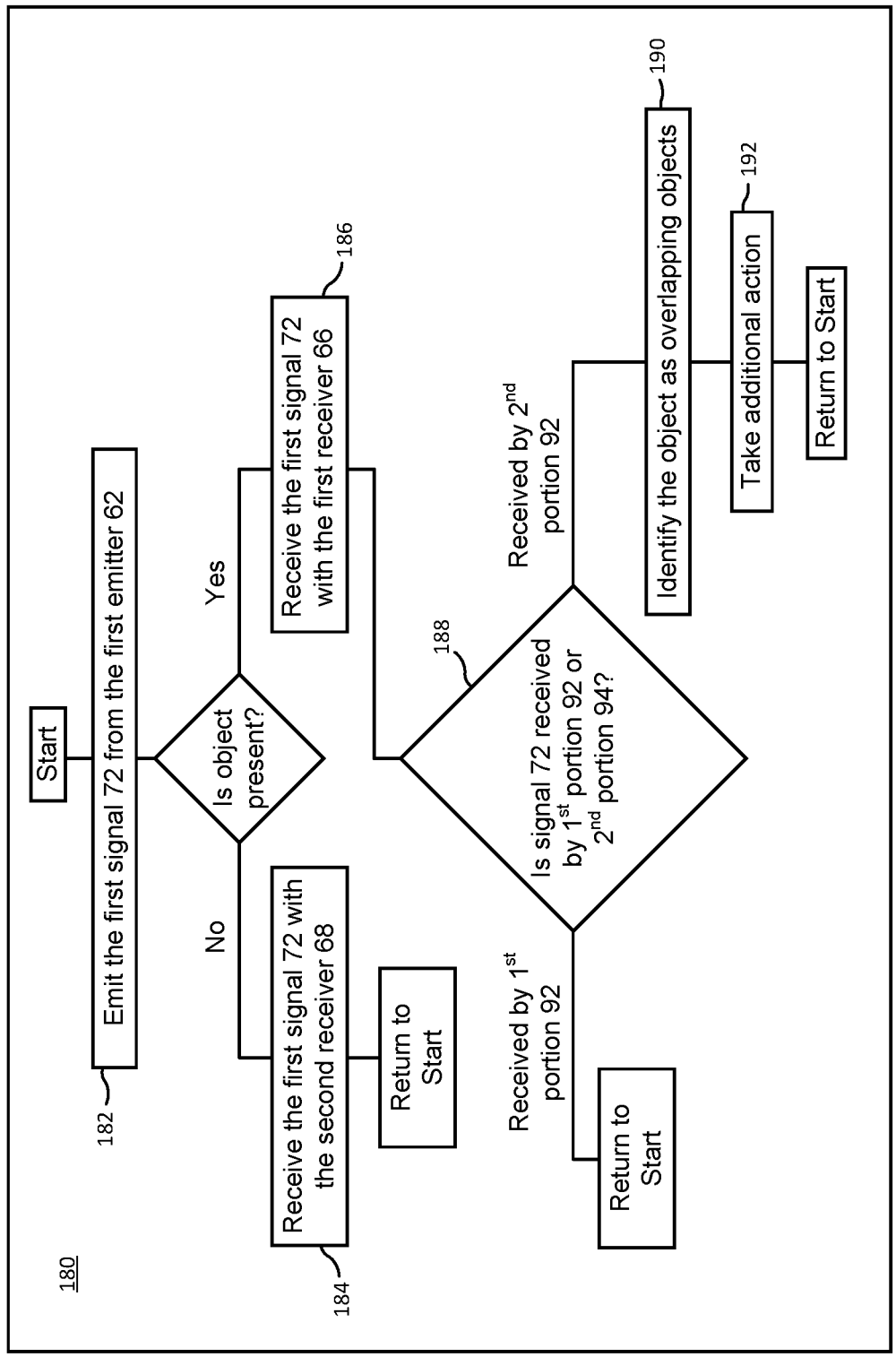
FIG. 12 is a flow diagram of another method of operation of the apparatus illustrated in FIG. 7, according to at least one illustrated embodiment.
Figure 14:
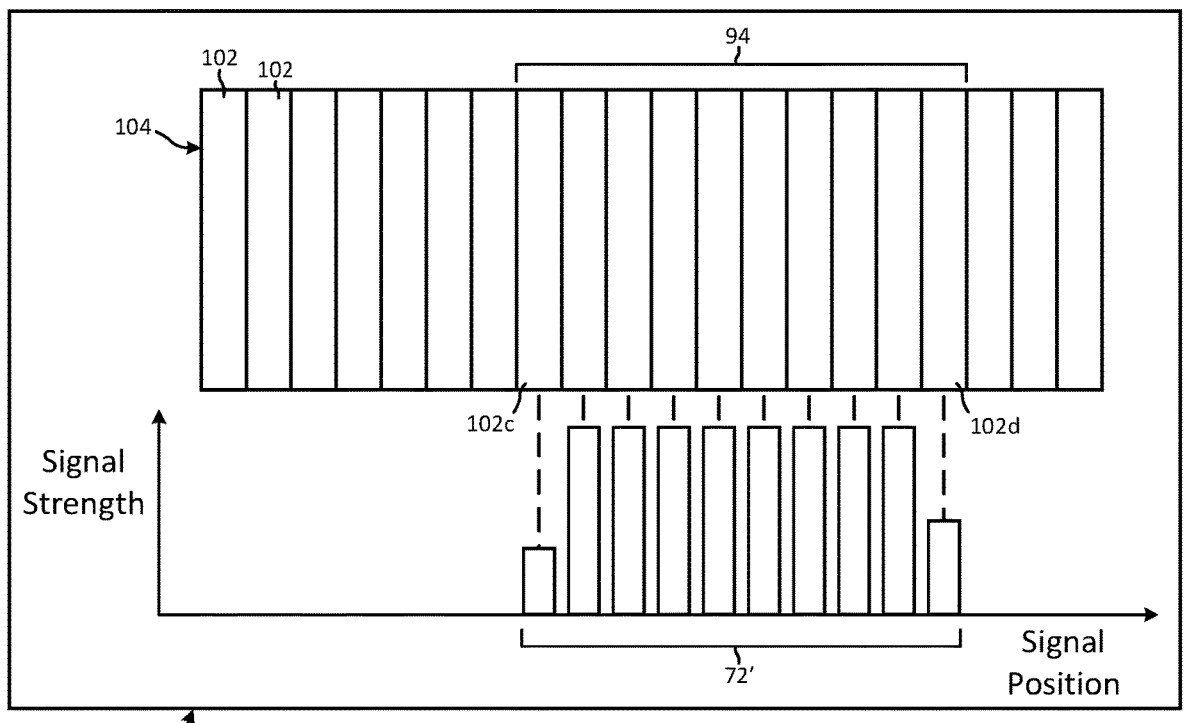
FIG. 14 is a schematic diagram of the line array sensor illustrated in FIG. 13, with a second portion of the line array sensor receiving a signal.

As shown in FIG. 14, the overlapping objects 44 with the second thickness T2 are occupying at least a portion of the plane 80 (e.g., as shown in FIGS. 9 and 10). After reflecting off of the first surface 30' of the overlapping objects 44, the first signal 72' is received/collected by the cells 102 of the second portion 94 of the first receiver 66.

Operation of the apparatus 60 in the measurement phase as described above may result in collection/determination of a position/thickness of the object 24/overlapping object 44 at both "ends" of the first signal 72, 72', and whether the object 24/overlapping objects 24 is/are uniform. According to one embodiment, these characteristics may be determined by a learning procedure that can help to understand if the parameters are stable across multiple objects 24/overlapping objects 44.

The strength of the signal received by each of the cells 102 in the first portion 92 may be relatively consistent (i.e., there is little variation in signal strength between adjacent ones of the cells 102 in the first portion 92), except for the first cell 102a and the last cell 102b (i.e., the outermost cells) of the first portion 92. The strength of the signal received by the outermost cells may be expected to be relatively inconsistent with (e.g., lower than) the strength of the signal received by adjacent ones of the cells 102 for different reasons (e.g., the location of an edge of the object 24). Similarly, the strength of the signal received by each of the cells 102 in the second portion 94 may be relatively consistent (i.e., there is little variation in signal strength between adjacent ones of the cells 102 in the second portion 94), except for the first cell 102c and the last cell 102d (i.e., the outermost cells) of the second portion 94.

Figure 15:
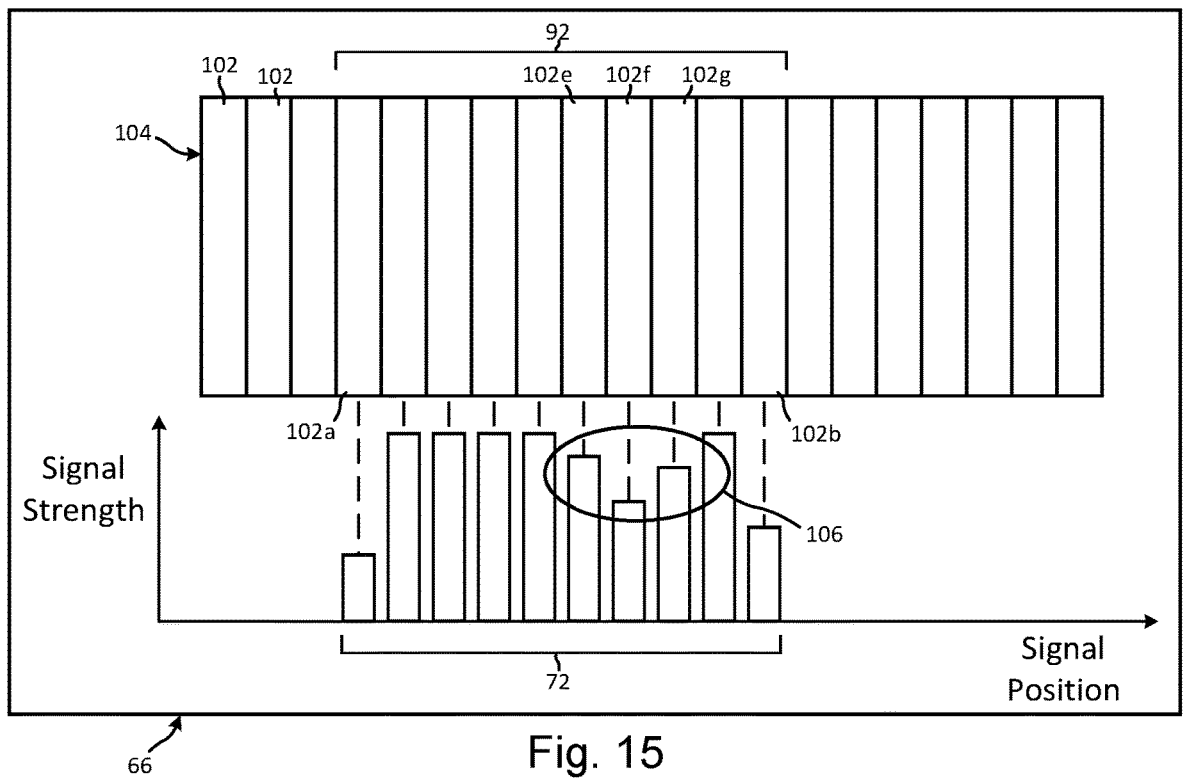
FIG. 15 is a schematic diagram of the line array sensor illustrated in FIG. 13, the first portion of the line array sensor receiving another signal.

The relatively consistent signal strength across the cells 102 of the first portion 92 and the second portion 94 are an indication that the apparatus 60 is operating correctly. As shown in FIG. 15, the strength of the signal received by some of the internal cells (e.g., cells 102e, 102f, 102g) within the first portion 92 may be less than the strength of the signal received by other ones of the cells 102 (e.g., the remainder of the cells 102 excluding the first cell 102a and the last cell 102b) within the first portion 92. This area of reduced signal strength 106 may indicate a problem that could impact performance of the apparatus 60.

Figure 16:
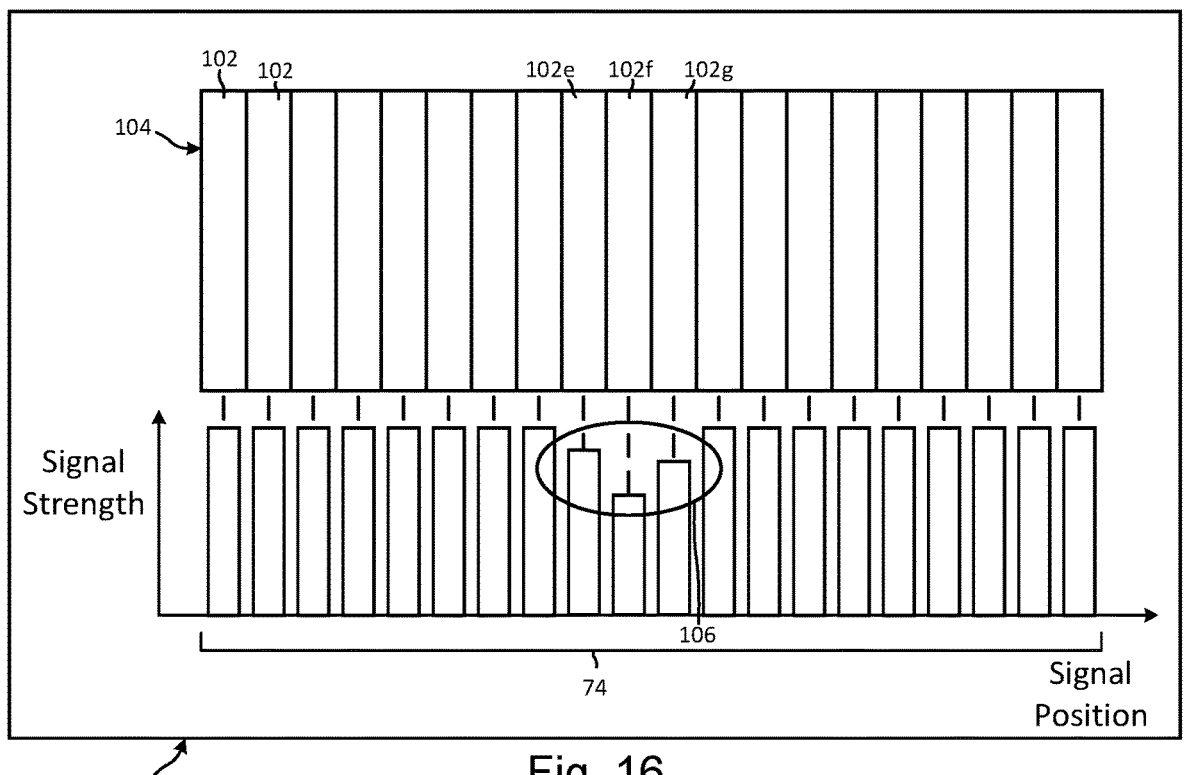
FIG. 16 is a schematic diagram of the line array sensor illustrated in FIG. 13, the line array sensor receiving another signal.

The specific problem causing the area of reduced signal strength 106 may be identified during the adjustment phase. As shown in FIG. 16, the cells 102 of the first receiver 66 may receive/collect the second signal 74 when the plane 80 is unoccupied by the object 24 and the apparatus 60 is in the adjustment phase. According to one embodiment, the second emitter 64 and the first receiver 66 may be positioned relative to one another such that a plurality (e.g., a majority, up to all) of the cells 102 of the line array sensor 104 receive/collect the second signal 74 when the plane 80 is unoccupied. If the strength of the second signal 74 has an area of reduced signal strength 106 (e.g., in cells 102e, 102f, 102g) similar to (e.g., matching) that of the first signal 72 received/collected by the first receiver 66, then the problem/cause of the area of reduced signal strength 106 may be debris (e.g., dirt, nebulized oil, etc.) on the first receiver 66.

As shown in FIG. 16, the cells 102 of the first receiver 66 may receive/collect the second signal 74 when the plane 80 is unoccupied by the object 24 and the apparatus 60 is in the adjustment phase. According to one embodiment, the second emitter 64 and the first receiver 66 may be positioned relative to one another such that a plurality (e.g., a majority, up to all) of the cells 102 of the line array sensor 104 receive/collect the second signal 74 when the plane 80 is unoccupied. If the strength of the second signal 74 has an area of reduced signal strength 106 (e.g., in cells 102e, 102f, 102g) similar to (e.g., matching) that of the first signal 72 received/collected by the first receiver 66, then the problem/cause of the area of reduced signal strength 106 may be debris (e.g., dirt, nebulized oil, etc.) on the first receiver 66.

Figure 17:
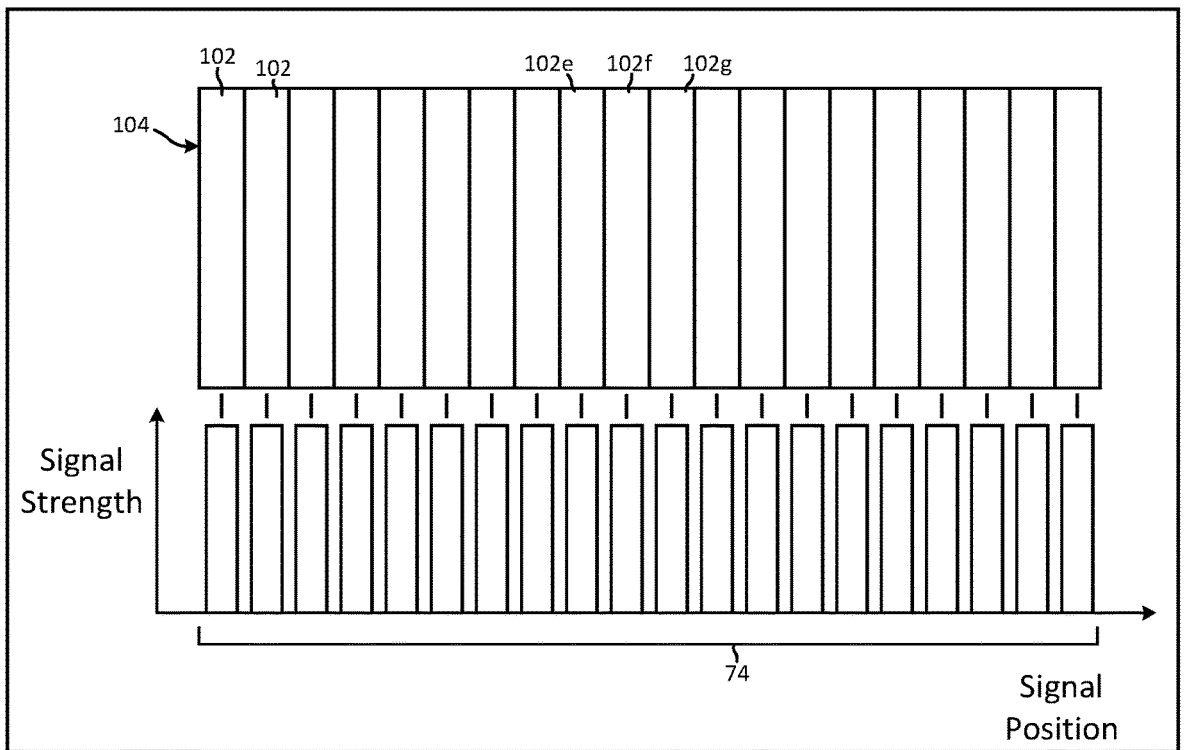
FIG. 17 is a schematic diagram of the line array sensor illustrated in FIG. 13, the line array sensor receiving another signal.

If, instead, the strength of the second signal 74 is devoid of the area of reduced signal strength 106 (i.e., all of the cells 102 receive/collect a similar signal strength as shown in FIG. 17), then the problem/cause of the area of reduced signal strength 106 is unlikely to be debris (e.g., dirt, nebulized oil, etc.) on the to the first receiver 66.

Figure 18:
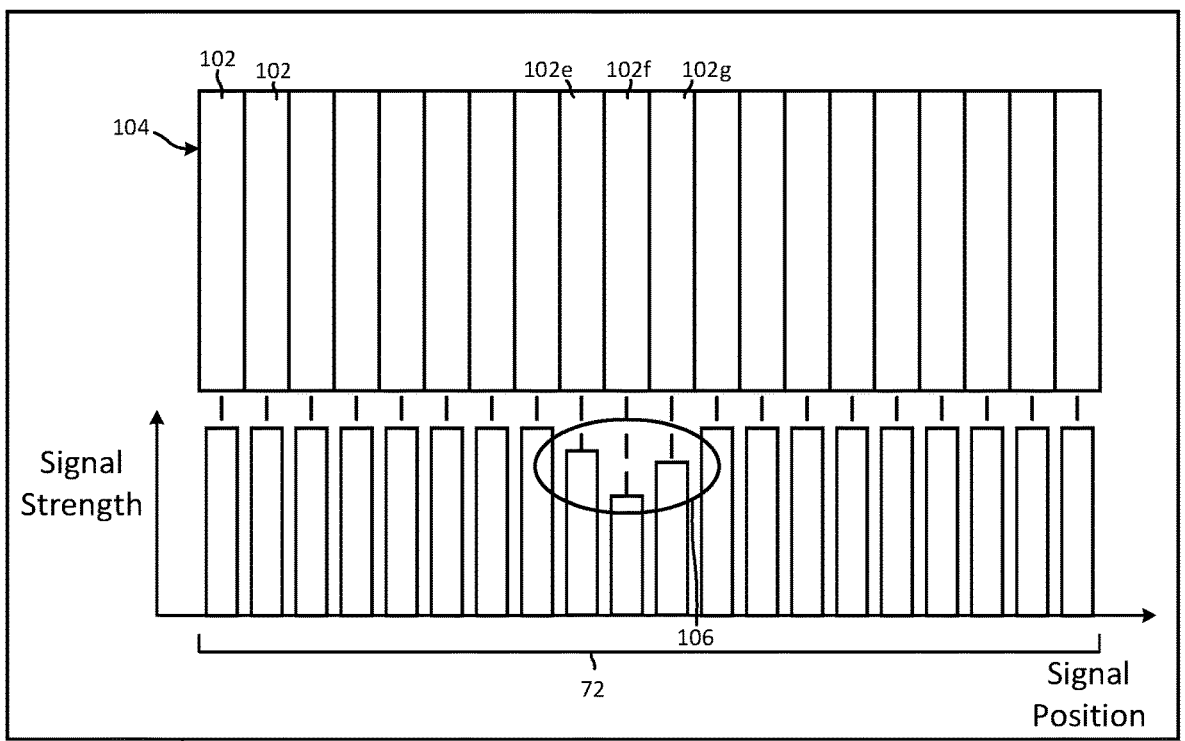
FIG. 18 is a schematic diagram of a line array sensor of another component of the apparatus illustrated in FIG. 7, the line array sensor receiving a signal.

As shown in FIG. 18, the strength of the first signal 72 received/collected by the second receiver 68 during the adjustment phase may have an area of reduced signal strength 106 (e.g., in cells 102e, 102f, 102g) similar to (e.g., matching) that of the first signal 72 received/collected by the first receiver 66 during the measurement phase. This indicates that the source of the problem/cause of the area of reduced signal strength 106 may be the first emitter 62 (e.g., debris, such as dirt, nebulized oil, etc. on the first emitter 62).

Figure 19:
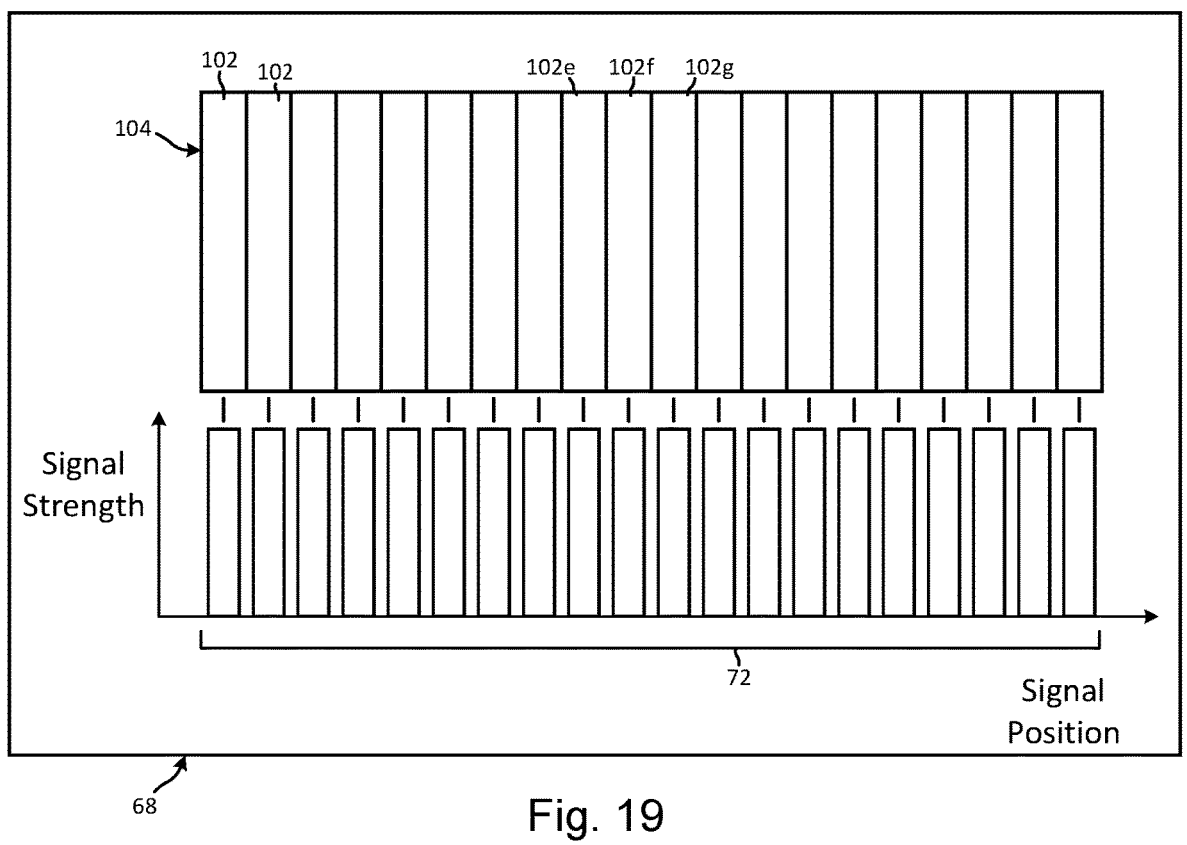
FIG. 19 is a schematic diagram of the line array sensor illustrated in FIG. 18, the line array sensor receiving another signal.
Figure 20:
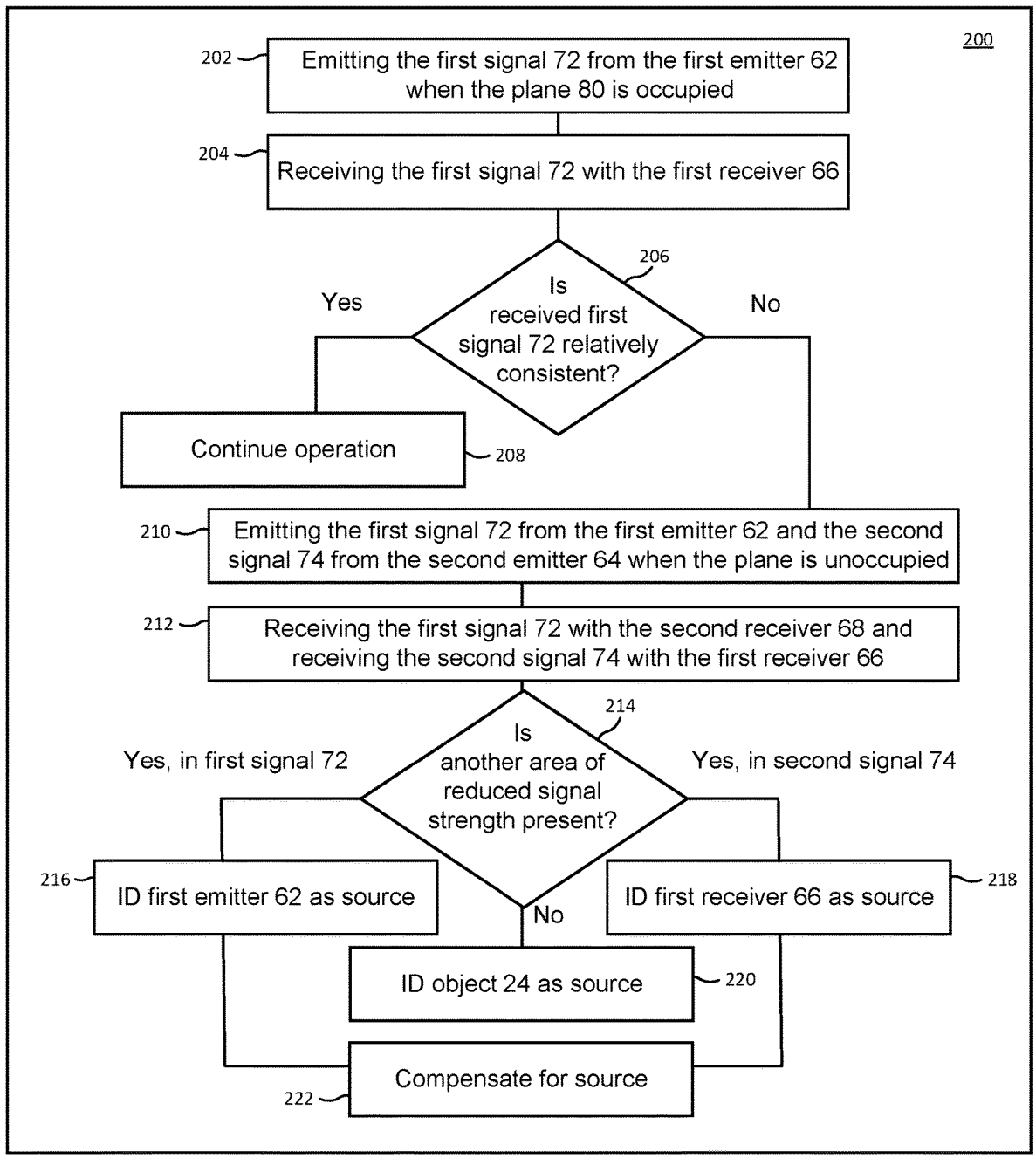
FIG. 20 is a flow diagram of a method of operation of the apparatus illustrated in FIG. 7, according to at least one illustrated embodiment.

If, during the adjustment phase, the strength of both the second signal 74 received/collected by the first receiver 66 is devoid of an area of reduced 106 signal strength (i.e., all of the cells 102 receive/collect a similar signal strength as shown in FIG. 17) and the first signal 72 is devoid of an area of reduced signal strength 106 (i.e., all of the cells 102 receive/collect a similar signal strength as shown in FIG. 19), then the source of the problem/cause of the area of reduced signal strength 106 may be the object 24 that passed through the plane 80 during the measurement phase, (e.g., a surface defect, debris on the first surface 30, etc.) and may be unrelated to any of the components of the apparatus 60.

Referring to FIGS. 13 to 20, a method 200 of operation of the apparatus 60 may include at 202 emitting the first signal 72 from the first emitter 62 towards the plane 80 when the object 24 or the overlapping objects 44 are occupying at least a portion of the plane 80. The method 200 may include, at 204, receiving/collecting the first signal 72 with the first receiver 66 (e.g., via one or more of the cells 102 of the line array sensor 104) after the first signal 72 has reflected off of an object (e.g., the object 24, the overlapping objects 44, etc.) that is occupying at least a portion of the plane 80. At 206, the method 200 may include determining whether the strength of the first signal 72, across each of the cells 102 that receive the first signal 72 is relatively consistent. According to one embodiment, the determining at 206 excludes the first cell/cells 102a and the last cell/cells 102b.

If the first signal 72 at 206 is relatively consistent (e.g., as shown in FIGS. 13 and 14), the method may include continued operation as shown at 208. If the first signal 72 at 206 is not relatively consistent (e.g., includes the area of reduced signal strength 106 as shown in Figure), the method may include identifying the area of reduced signal strength 106 (e.g., identifying the cells 102 that are receiving and thereby forming the area of reduced signal strength 106). The method 200 may include a method of identifying a source of the area of reduced signal strength 106 (e.g., continuing at 210 as described below).

The method may include, at 210, emitting the first signal 72 from the first emitter 62 towards the plane 80 and emitting the second signal 74 from the second emitter 64 towards the plane 80, when the plane 80 is unoccupied by an object. The method 200 may include, at 212, receiving/collecting the first signal 72 with the second receiver 68 (e.g., via one or more of the cells 102 of the line array sensor 104) after the first signal 72 has passed through the plane 80 without reflecting off of an object (e.g., the object 24, the overlapping objects 44, etc.) that is occupying at least a portion of the plane 80. The method 200 may further include, at 212, receiving/collecting the second signal 74 with the first receiver 66 (e.g., via one or more of the cells 102 of the line array sensor 104) after the second signal 74 has passed through the plane 80 without reflecting off of an object (e.g., the object 24, the overlapping objects 44, etc.) that is occupying at least a portion of the plane 80.

At 214, the method may include determining whether the first signal 72 received by the second receiver 68, the second signal 74 received by the first receiver 66, or both includes an area of reduced signal strength 106 similar to the area of reduced signal strength 106 received by the first receiver 66 from the first emitter 72.

If the first signal 72 received by the second receiver 68 includes the area of reduced signal strength 106, the method 200 may include, at 216, identifying the first emitter 62 as the source of the area of reduced signal strength 106. If the second signal 74 received by the first receiver 66 includes the area of reduced signal strength 106, the method 200 may include, at 218, identifying the first receiver 66 as the source of the area of reduced signal strength 106. If neither the first signal 72 received by the second receiver 68 nor the second signal 74 received by the first receiver 66 includes the area of reduced signal strength 106, the method 200 may include, at 220, identifying the object 24 or the overlapping objects 44 as the source of the area of reduced signal strength 106.

The method 200 may further include, at 222, compensating for the source of the area of reduced signal strength 106. Compensating for the source of the area of reduced signal strength 106 may include adjusting the circuitry 70 of the apparatus 60 to change the value of the received signals by the cells 102 taking into account the reduced value/percentage due to the dirt spot(s) or other source identified at 216, 218, or 220 to optimize signal acquisition.

Build up of debris over time may be detrimental to operation of the apparatus 60 as the increasing debris may result in erroneous identification of the first portion 92 and/or the second portion 94. This build up may happen slowly over time with respect to the continuous acquisition of the objects 24. Thus, when the area of reduced signal strength 106 is detected early, it is possible to adjust the reference value(s) to compensate and prolong accurate operation of the apparatus 60.

For example, if one end of the first portion 92 and/or the second portion 94 changes (e.g., the first cell 102*a* or the second cell 102*b* receives a reduced signal strength) due to debris being present, but the other end of the first portion 92 and/or the second portion 94 maintains its reference value, the changed one end may be discarded/ignored, and a new end may be established as the correct one. Due to the changed one end, a new centroid for the first portion 92 and/or the second portion 94 may be established as the new reference centroid (if the centroid is used during the measurement phase).

If both ends (and, if used, also the centroid) of the first portion 92 and/or the second portion 94 change at the same time (e.g., due to the presence of debris) the previous or the subsequent adjustment phase may be used to compensate for the change. For example, if the change remains constant across multiple, subsequent phases, the changed first portion 92 and/or second portion 94 may be established as the new reference. Alternatively, the system 60 may send an alarm output to automatically (or to a user to) stop the system 20.

Another potential problem that may impact performance of the apparatus 60 is related to airborne debris (e.g., nebulized oil) that is floating between (i.e., not stuck/fixed to) components of the apparatus 60. To minimize the impact of this airborne debris, the apparatus 60 may include a teaching phase/procedure, during which exposure time for signal acquisition is varied. This varied exposure time may result in a mean value that compensates for/filters out the impact of the airborne debris. The impact of the airborne debris may be dependent on the speed of the airborne particles and the components (if any) used to grease the objects 24.

Those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and transitory or transmission type media such as digital and analog communication links using TDM or IP based communication links (e.g., packet links).

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An apparatus, comprising:
  a first emitter positioned to emit a first signal toward a plane from a first side of the plane;
  a second emitter positioned to emit a second signal toward the plane from a second side of the plane, the second side of the plane opposed across a thickness of the plane from the first side of the plane, and the second signal different from the first signal;
  a first receiver positioned to receive the second signal that passes through the plane when the plane is unoccupied, and further positioned to receive the first signal which reflects from a first surface of an object when the object occupies at least a portion of the plane;
  a second receiver positioned to receive the second signal which reflects from a second surface of the object when the object occupies at least a portion of the plane, and further positioned to receive the first signal that passes through the plane when the plane is unoccupied, the second surface of the object opposed to the first surface of the object across a thickness of the object; and
  a circuitry coupled to the first receiver and at least the second receiver, the circuitry operable to determine the thickness of the object based on reflections of the first signal and the second signal detected respectively by the first receiver and second receiver when the object occupies at least a portion of the plane.

2. The apparatus of claim 1 wherein the first emitter is positioned diagonally opposite from the second receiver across the plane and the second emitter is positioned diagonally opposite from the first receiver across the plane.

3. The apparatus of claim 1 wherein the first emitter is located in a first quadrant, the first receiver is located in a second quadrant, the second receiver is located in a third quadrant, and the second emitter is located in a fourth quadrant of a rectangular frame, wherein the quadrants are arranged successively either clockwise or counterclockwise around the rectangular frame.

4. The apparatus of claim 1 wherein the first signal comprises a first pattern and the second signal comprises a second pattern, the second pattern is different than the first pattern, and the circuitry determines whether the object occupies at least the portion of the plane based on:
   i) whether the first receiver has detected the first signal having the first pattern or the second signal having the second pattern;
   ii) whether the second receiver has detected the first signal having first pattern or the second signal having the second pattern; or
   iii) both.

5. The apparatus of claim 1 wherein the first emitter and the second emitter are synchronized to emit the first signal and the second signal, respectively, at different times, and the circuitry determines whether the object occupies at least the portion of the plane based on the time at which:
   i) the first receiver has detected either the first signal or the second signal;
   ii) the second receiver has detected either the first signal or the second signal; or
   iii) both.

6. The apparatus of claim 1 wherein the first emitter emits the first signal as a first pattern of electromagnetic radiation, the second emitter emits the second signal as a second pattern of electromagnetic radiation, the first receiver and the second receiver are each responsive to the electromagnetic radiation, and the circuitry determines whether the object occupies at least the portion of the plane based on:
   i) whether the first receiver has detected the first signal having the first pattern of electromagnetic radiation or the second signal having the second pattern of electromagnetic radiation;
   ii) whether the second receiver has detected the first signal having the first pattern of electromagnetic radiation or the second signal having the second pattern of electromagnetic radiation; or
   iii) both.

7. The apparatus of claim 1 wherein the first emitter emits the first signal as a first pattern of acoustic energy and the second emitter emits the second signal as a second pattern of acoustic energy, and the circuitry determines whether the object occupies at least the portion of the plane based on:
   i) whether the first receiver has detected the first signal having the first pattern of acoustic energy or the second signal having the second pattern of acoustic energy;
   ii) whether the second receiver has detected the first signal having the first pattern of acoustic energy or the second signal having the second pattern of acoustic energy; or
   iii) both.

8. The apparatus of claim 1 wherein the circuitry determines the thickness of the object based on reflections of the first signal and the second signal detected respectively by the first receiver and the second receiver when the object occupies at least a portion of the plane.

9. The apparatus of claim 1 wherein the circuitry determines the thickness of the object based on a relative position of the first receiver that receives the first signal after the first signal reflects off of the object that occupies at least a portion of the plane.

10. The apparatus of claim 1, further comprising:
    a housing that at least partially encloses the first emitter, the second emitter, the first receiver, and the second receiver within an interior of the apparatus; and
    an opening that provides passage from an exterior of the apparatus to the interior of the apparatus,
    wherein the opening has a height that is measured in a same direction as the thickness of the object, and the height is greater than the thickness of the object allowing passage of the object through the opening and into the interior.

11. The apparatus of claim 1 wherein the apparatus includes a plurality of phases of operation, the plurality of phases of operation including:
    a measurement phase in which:
       the first receiver detects the first signal from the first emitter after reflecting off of an object occupying at least a portion of the plane;
       the second receiver detects the second signal from the second emitter after reflecting off of the object occupying at least a portion of the plane; or
       both; and
    an adjustment phase in which:
       the first receiver detects the second signal from the second emitter passing through the plane without reflecting off of an object occupying at least a portion of the plane;
       the second receiver detects the first signal from the first emitter passing through the plane without reflecting off of an object occupying at least a portion of the plane; or
       both.

12. The apparatus of claim 11 wherein the circuitry is operable to:
    determine a strength of the first signal received by the first receiver during the measurement phase, and identify an area of reduced signal strength;
    determine the strength of the second signal received by the first receiver during the adjustment phase, and identify an area of reduced signal strength; and
    based on the identified areas of reduced signal strength, identify a source of the areas of reduced signal strength.

13. The apparatus of claim 12 wherein the circuitry is operable to:
    based on the identified source of the areas of reduced signal strength, adjust parameters of the apparatus to compensate for the identified source.

14. A method of operation of an apparatus, the method comprising:
    emitting a first signal from a first emitter of the apparatus towards a plane when a portion of the plane is occupied by a first object having a first thickness;
    detecting the first signal with a first portion of a first receiver of the apparatus after the first signal has reflected off of the first object;
    identifying the first thickness as being within an acceptable range of thicknesses;
    emitting the first signal from the first emitter towards the plane when the portion of the plane is unoccupied;

detecting the first signal with a second receiver of the apparatus after the first signal has passed through the plane;

emitting the first signal from the first emitter towards the plane when a portion of the plane is occupied by a second object having a second thickness;

detecting the first signal with a second portion of the first receiver after the first signal has reflected off of the second object; and identifying the second thickness as being outside the acceptable range of thicknesses.

15. The method of claim 14 wherein:

the first portion includes a first subset of a plurality of cells of a line array sensor;

the second portion includes a second subset of the plurality of cells of the line array sensor;

at least one of the plurality of cells is part of the first subset and is not part of the second subset; and at least one of the plurality of cells is part of the second subset and is not part of the first subset.

16. The method of claim 14, further comprising:

passing at least a portion of the first object through an opening of a housing of the apparatus, wherein the housing at least partially encloses the first emitter, the first receiver, and the second receiver; and passing at least a portion of the second object through an opening of a housing of the apparatus.

17. The method of claim 14 wherein the second object includes at least two objects that are a same as the first object, the at least two objects overlapping such that their thicknesses are aligned.

18. The method of claim 14, further comprising:

detecting a strength of the first signal received by the first receiver;

identifying a first area of reduced signal strength;

detecting a strength of the first signal received by the second receiver;

identifying a second area of reduced signal strength; and based on the identified first and second areas of reduced signal strength, identifying a source of the areas of reduced signal strength.

19. The method of claim 14, further comprising:

emitting a second signal from a second emitter of the apparatus towards the plane when the portion of the plane is occupied by the first object;

detecting the second signal with a first portion of the second receiver after the second signal has reflected off of the first object;

emitting the second signal from the second emitter towards the plane when the portion of the plane is unoccupied; and detecting the second signal with the first receiver after the second signal has passed through the plane.

20. The method of claim 19, further comprising:

detecting a strength of the first signal received by the first receiver;

detecting a strength of the first signal received by the second receiver;

detecting a strength of the second signal received by the first receiver;

detecting a strength of the second signal received by the second receiver;

identifying one or more areas of reduced signal strength; and based on the identified one or more areas of reduced signal strength, identifying a source of the one or more areas of reduced signal strength.

* * * * *